(12) United States Patent
Min et al.

(10) Patent No.: US 8,792,547 B2
(45) Date of Patent: Jul. 29, 2014

(54) METHOD AND APPARATUS FOR ENCODING VIDEO BASED ON SCANNING ORDER OF HIERARCHICAL DATA UNITS, AND METHOD AND APPARATUS FOR DECODING VIDEO BASED ON SCANNING ORDER OF HIERARCHICAL DATA UNITS

(75) Inventors: Jung-hye Min, Suwon-si (KR); Hae-kyung Jung, Seoul (KR); Il-koo Kim, Osan-si (KR); Min-su Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 718 days.

(21) Appl. No.: 13/019,343

(22) Filed: Feb. 2, 2011

(65) Prior Publication Data

US 2011/0188572 A1 Aug. 4, 2011

(30) Foreign Application Priority Data

Feb. 2, 2010 (KR) ........................ 10-2010-0009642

(51) Int. Cl.
*H04N 11/02* (2006.01)
*H04N 7/26* (2006.01)
*H04N 7/50* (2006.01)

(52) U.S. Cl.
CPC .............................. *H04N 19/00084* (2013.01); *H04N 7/50* (2013.01)
USPC ....................................................... 375/240

(58) Field of Classification Search
CPC .................. H04N 19/00569; H04N 19/00842; H04N 19/00763; H04N 19/00066; H04N 19/00896; H04N 19/00072; H04N 19/00303; H04N 19/00278
USPC .......................................... 375/240; 382/240
See application file for complete search history.

(56) References Cited

U.S. PATENT DOCUMENTS

| 6,084,908 | A  | * | 7/2000  | Chiang et al. | ............ | 375/240.03 |
| 6,795,505 | B2 | * | 9/2004  | Felts | ........................ | 375/240.19 |
| 6,970,604 | B1 | * | 11/2005 | Chai | ............................. | 382/240 |
| 7,031,533 | B2 | * | 4/2006  | Felts et al. | .................... | 382/240 |
| 7,606,434 | B2 | * | 10/2009 | Chai et al. | ..................... | 382/240 |
| 7,634,145 | B2 | * | 12/2009 | Keith et al. | ................... | 382/233 |

(Continued)

OTHER PUBLICATIONS

NPL—Picture segmentation by a tree traversal algorithm, Steven L. Horowitz, (1978).*

(Continued)

*Primary Examiner* — William C Vaughn, Jr.
*Assistant Examiner* — Luis M Perez
(74) *Attorney, Agent, or Firm* — Sughrue Mion, PLLC

(57) ABSTRACT

A video decoding method and apparatus and a video encoding method and apparatus based on a scanning order of hierarchical data units are provided. The decoding method includes: receiving and parsing a bitstream of an encoded video; extracting from the bitstream information about a size of a maximum coding unit for decoding a picture of the encoded video, and encoding information about a coded depth and an encoding mode for coding units of the picture, wherein the size of the maximum coding unit is a maximum size of a coding unit which is a data unit for decoding the picture; and determining a hierarchical structure of the maximum coding unit and the coding units into which the picture is divided according to depths, and decoding the picture based on the coding units, by using the information about the size of the maximum coding unit and the encoding information about the coded depth and the encoded mode.

34 Claims, 23 Drawing Sheets

(56) References Cited

U.S. PATENT DOCUMENTS

| | | | |
|---|---|---|---|
| 8,295,355 B2 * | 10/2012 | Lee et al. | 375/240.16 |
| 8,311,110 B2 * | 11/2012 | Alshina et al. | 375/240.12 |
| 8,446,953 B2 * | 5/2013 | Song et al. | 375/240.12 |
| 8,532,185 B2 * | 9/2013 | Jung et al. | 375/240.12 |
| 2001/0043751 A1 | 11/2001 | Takahashi et al. | |
| 2005/0036701 A1 | 2/2005 | Miyazawa et al. | |
| 2005/0074177 A1 | 4/2005 | Ichimura et al. | |

OTHER PUBLICATIONS

NPL—Quadtree-based adaptive loop filter, Toshiba, (2009).*
Communication dated Oct. 4, 2011 issued by the International Searching Authority in counterpart International Application No. PCT/KR2011/000744.

* cited by examiner

FIG. 7
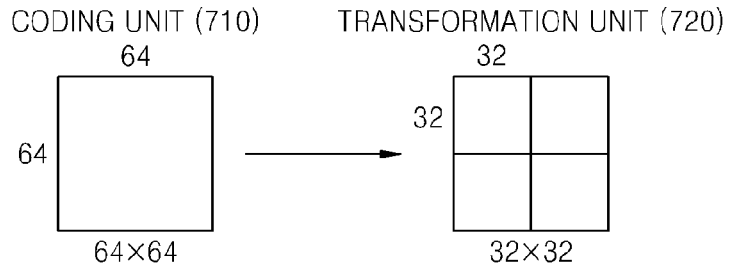
FIG. 8
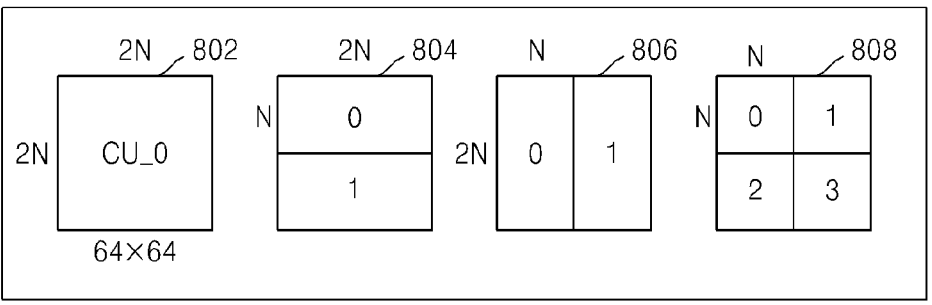
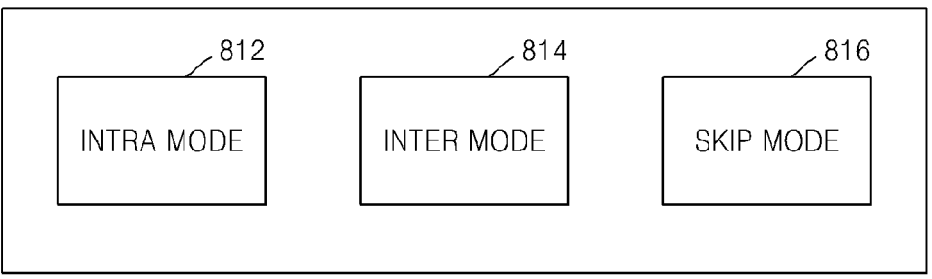
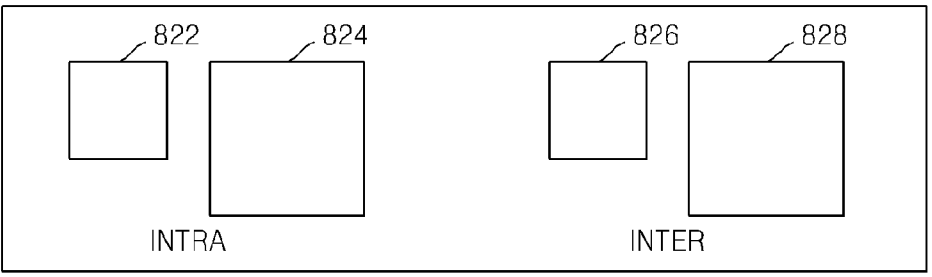

CODING UNITS (1010)

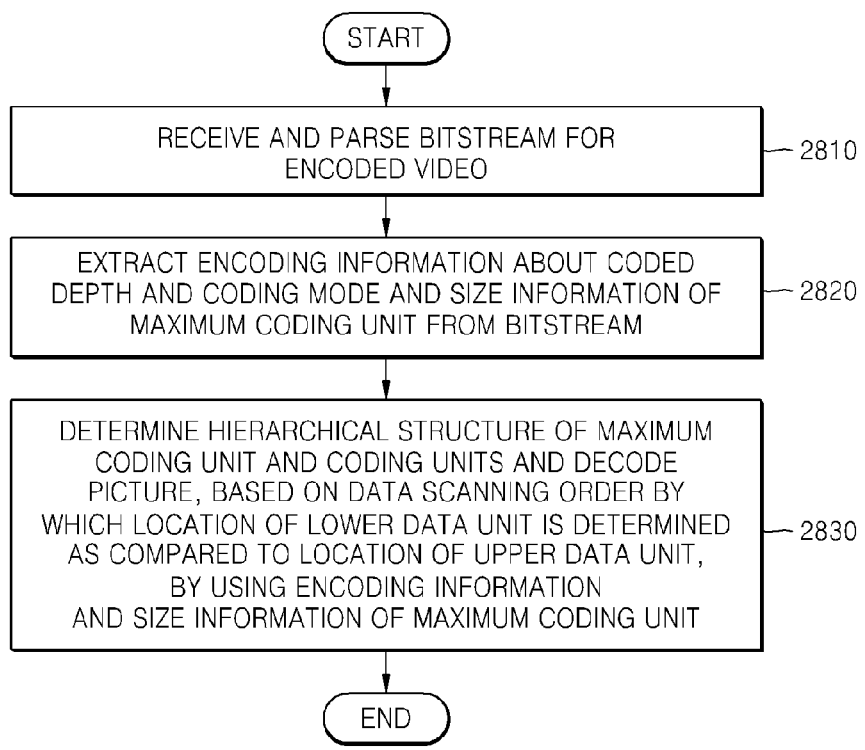

METHOD AND APPARATUS FOR ENCODING VIDEO BASED ON SCANNING ORDER OF HIERARCHICAL DATA UNITS, AND METHOD AND APPARATUS FOR DECODING VIDEO BASED ON SCANNING ORDER OF HIERARCHICAL DATA UNITS

CROSS-REFERENCE TO RELATED PATENT APPLICATION

This application claims priority from Korean Patent Application No. 10-2010-0009642, filed on Feb. 2, 2010 in the Korean Intellectual Property Office, the disclosure of which is incorporated herein in its entirety by reference.

BACKGROUND

1. Field

Apparatuses and methods consistent with exemplary embodiments relate to encoding and decoding a video.

2. Description of the Related Art

As hardware for reproducing and storing high resolution or high quality video content is being developed and supplied, a need for a video codec for effectively encoding or decoding the high resolution or high quality video content is increasing. In a related art video codec, a video is encoded according to a limited encoding method based on a macroblock having a predetermined size.

SUMMARY

Aspects of exemplary embodiments provide video encoding and decoding based on a scanning order that depends on absolute locations and relative locations of coding units and data units that constitute a hierarchical structure.

According to an aspect of an exemplary embodiment, there is provided a video decoding method based on a scanning order of hierarchical data units, the method including: receiving and parsing a bitstream of an encoded video; extracting, from the bitstream, information about a size of a maximum coding unit for decoding a picture of the encoded video, and encoding information about a coded depth and an encoding mode for coding units of the picture, wherein the size of the maximum coding unit is a maximum size of a coding unit which is a data unit for decoding the picture; and determining a hierarchical structure of the maximum coding unit and the coding units into which the picture is divided according to depths, and decoding the picture based on the coding units, by using the information about the size of the maximum coding unit and the encoding information about the coded depth and the encoded mode, wherein a data scanning order of an upper data unit and a lower data unit included in the hierarchical structure of the maximum coding unit and the coding units is determined based on an absolute location or a relative location of the lower data unit in comparison to a location of the upper data unit.

Based on the hierarchical structure of the maximum coding unit and the coding units, the lower data unit of the maximum coding unit may include at least one of deeper coding units according to the depths, a coding unit of the coded depth, a prediction unit for prediction-decoding the coding unit, a partition into which the prediction unit is split, a transformation unit for inversely transforming the coding unit, and a minimum unit, and the upper data unit may include at least one lower data unit in an order of the maximum coding unit, the deeper coding units according to the depths, the coding unit of the coded depth, the prediction unit, the partition, and the minimum unit.

The decoding may include determining a relative location of the lower coding unit with respect to the maximum coding unit or an absolute location of the lower coding unit in the picture by using a relative location of the upper coding unit with respect to the maximum coding unit or an absolute location of the upper coding unit in the picture.

According to an aspect of another exemplary embodiment, there is provided a video encoding method based on a scanning order of hierarchical data units, the method including: splitting a picture into a maximum coding unit which has a maximum size and is a data unit in which the picture is encoded; determining the maximum coding unit and the coding units having a hierarchical structure and determining a coded depth and an encoding mode of the coding units, by encoding the picture based on the maximum coding unit and the coding units, into which the picture is split according to depths; and outputting encoding information about the coded depth and the encoding mode and size information of the maximum coding unit, wherein a data scanning order of data units belonging to the hierarchical structure of the maximum coding unit and the coding units is determined based on an absolute position or a relative position of a lower data unit as compared to an upper data unit.

According to an aspect of another exemplary embodiment, there is provided a video decoding apparatus based on a scanning order of hierarchical data units, the apparatus including: a receiver which receives and parses a bitstream for an encoded video; an extractor which extracts, from the bitstream, information about a size of a maximum coding unit for decoding a picture of the encoded video, and encoding information about a coded depth and an encoding mode for coding units of the picture, wherein the size of the maximum coding unit is a maximum size of a coding unit which is a data unit for decoding the picture; and a decoder which determines a hierarchical structure of the maximum coding unit and the coding units into which the picture is divided according to depths, and decodes the picture based on the coding units, by using the information about the size of the maximum coding unit and the encoding information about the coded depth and the encoded mode, wherein a data scanning order of an upper data unit and a lower data unit included in the hierarchical structure of the maximum coding unit and the coding units is determined based on an absolute location or a relative location of the lower data unit in comparison to a location of the upper data unit.

According to an aspect of another exemplary embodiment, there is provided a video encoding apparatus based on a scanning order of hierarchical data units, the apparatus including: a maximum coding unit splitter which splits a picture into a maximum coding unit which has a maximum size and is a data unit in which the picture is encoded; a coding unit determiner which determines the maximum coding unit and the coding units having a hierarchical structure and determines a coded depth and an encoding mode of the coding units, by encoding the picture based on the maximum coding unit and the coding units, into which the picture is split according to depths; and an information output unit which outputs encoding information about the coded depth and the encoding mode and size information of the maximum coding unit, wherein a data scanning order of data units belonging to the hierarchical structure of the maximum coding unit and the coding units is determined based on an absolute position or a relative position of a lower data unit as compared to an upper data unit.

According to an aspect of another exemplary embodiment, there is provided a computer-readable recording medium having recorded thereon a program for executing the video encoding method.

According to an aspect of another exemplary embodiment, there is provided a computer-readable recording medium having recorded thereon a program for executing the video decoding method.

BRIEF DESCRIPTION OF THE DRAWINGS

The above and other features will become more apparent by describing in detail exemplary embodiments with reference to the attached drawings in which:

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

FIG. 28 illustrates locations of minimum units in the 2N×2N sized maximum coding unit and prediction units of a partition type nL×2N according to an exemplary embodiment;

FIG. 29 illustrates locations of minimum units in the 2N×2N sized maximum coding unit and prediction units of a partition type nR×2N according to an exemplary embodiment;

FIG. 31 is a flowchart of a method of decoding a video based on a scanning order of hierarchical data units, according to an exemplary embodiment.

DETAILED DESCRIPTION OF EXEMPLARY EMBODIMENTS

Figure 1:
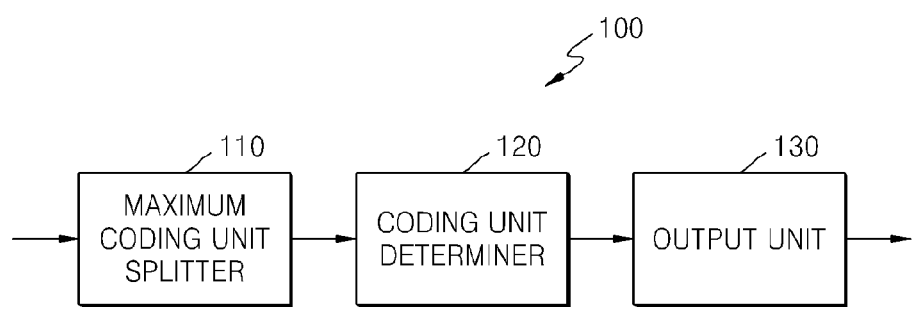
FIG. 1 is a block diagram of an apparatus for encoding a video, according to an exemplary embodiment.

Hereinafter, a video encoding apparatus, a video decoding apparatus, a video encoding method, and a video decoding method according to exemplary embodiments will be described more fully with reference to FIGS. 1 through 31 below, in which like reference numerals refer to like elements throughout. Video encoding and decoding based on spatially hierarchical data units according to exemplary embodiments will now be described with reference to FIGS. 1 through 15, and video encoding and decoding based on a scanning order of hierarchical data units according to exemplary embodiments will now be described with reference to FIGS. 16 through 31. Expressions such as "at least one of," when preceding a list of elements, modify the entire list of elements and do not modify the individual elements of the list.

Hereinafter, a coding unit is an encoding data unit in which the image data is encoded at an encoder side and an encoded data unit in which the encoded image data is decoded at a decoder side, according to exemplary embodiments. Also, a coded depth indicates a depth where a coding unit is encoded.

Hereinafter, an 'image' may denote a still image for a video or a moving image, that is, the video itself.

FIG. 1 is a block diagram of a video encoding apparatus 100, according to an exemplary embodiment. Referring to FIG. 1, the video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and height in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit. Accordingly, as the depth deepens or increases, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into one or more maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. The coding unit determiner 120 encodes at least one split region obtained by splitting a region of the maximum coding unit according to depths, and determines a depth to output a finally encoded image data according to the at least one split region. For example, the coding unit determiner 120 determines a coded depth by encoding the image data in the deeper coding units according to depths, according to the maximum coding unit of the current picture, and selecting a depth having the least encoding errors. For example, the coding unit determiner 120 determines a coded depth by encoding the image data in the deeper coding units according to depths, according to the maximum coding unit of the current picture, and selecting a depth having the least encoding errors. Thus, the encoded image data of the coding unit corresponding to the determined coded depth is output by the coding unit determiner 120. Thus, the encoded image data of the coding unit corresponding to the determined coded depth is output by the coding unit determiner 120. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding errors may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split to regions according to the depths and the encoding errors may differ according to regions in the one maximum coding unit. Thus, the coded depths may differ according to regions in the image data. Therefore, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The coding units having a tree structure according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to a number of splitting times from a maximum coding unit to a minimum coding unit. A first maximum depth according to an exemplary embodiment may denote a total number of splitting times from the maximum coding unit to the minimum coding unit. A second maximum depth according to an exemplary embodiment may denote a total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist. In this case, the first maximum depth may be set to 4, and the second maximum depth may be set to 5.

Prediction encoding and transformation may be performed according to the maximum coding unit. The prediction encoding and the transformation may also be performed based on the deeper coding units according to a depth equal to, or depths less than, the maximum depth, according to the maximum coding unit. Transformation may be performed according to a method of orthogonal transformation or integer transformation.

Since the number of deeper coding units increases whenever the maximum coding unit is split according to depths, encoding including the prediction encoding and the transformation may be performed on all of the deeper coding units generated as the depth deepens. For convenience of description, the prediction encoding and the transformation will now be described based on a coding unit of a current depth, in a maximum coding unit.

The video encoding apparatus 100 may variably select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform the prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for the prediction encoding will now be referred to as a prediction unit. A partition obtained by splitting the prediction unit may include a prediction unit or a data unit obtained by splitting at least one of a height and a width of the prediction unit.

For example, when a coding unit of a size of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting a height or a width of the prediction unit, partitions obtained by asymmetrically splitting the height or the width of the prediction unit (such as 1:n or n:1), partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on prediction units in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will hereinafter be referred to as a transformation unit. A transformation depth indicating a number of splitting times to reach the transformation unit by splitting a height and a width of the coding unit may also be set for the transformation unit. For example, in a current coding unit of 2N×2N, a transformation depth may be 0 when a size of a transformation unit is also 2N×2N, may be 1 when each of the height and the width of the current coding unit is split into two equal parts, totally split into $4^1$ transformation units, and the size of the transformation unit is thus N×N, and may be 2 when each of the height and the width of the current coding unit is split into four equal parts, totally split into $4^2$ transformation units, and the size of the transformation unit is thus N/2×N/2. In other words, the transformation unit may be set according to a hierarchical tree structure, in which a transformation unit of an upper transformation depth is split into four transformation units of a lower transformation depth according to hierarchical characteristics of a transformation depth.

Similar to the coding unit, the transformation unit in the coding unit may be recursively split into smaller sized regions, so that the transformation unit may be determined independently in units of regions. Thus, residual data in the coding unit may be divided according to the transformation units having the tree structure according to transformation depths.

Encoding information according to coding units corresponding to a coded depth uses not only information about the coded depth, but also information about information related to prediction encoding and transformation. Accordingly, the coding unit determiner 120 not only determines a coded depth having a minimum encoding error, but also determines a partition type in a prediction unit, a prediction mode according to prediction units, and a size of a transformation unit for transformation.

Coding units according to a tree structure in a maximum coding unit and a method of determining a partition, according to one or more exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image. The information about the encoding mode according to coded depth may include at least one of information about the coded depth, information about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth. Thus, the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth. Thus, the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths. Thus, information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment may be a rectangular data unit obtained by splitting the minimum coding unit having the lowermost depth by 4. Alternatively, the minimum unit may be a maximum-size rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include at least one of information about the prediction mode and information about a size of the partitions. The encoding information according to the prediction units may include at least one of information about an estimated direction of an inter mode, information about a reference image index of the inter mode, information about a motion vector, information about a chroma component of an intra mode, and information about an interpolation method of the intra mode. Also, information about a maximum size of the coding unit defined according to pictures, slices, or groups of pictures (GOPs), and information about a maximum depth may be inserted into a Sequence Parameter Set (SPS) or a header of a bitstream.

In the video encoding apparatus 100, the deeper coding unit may be a coding unit obtained by dividing at least one of a height and a width of a coding unit of an upper depth, which is one layer above, by two. In other words, when the size of the coding unit of the current depth is 2N×2N, the size of the coding unit of the lower depth may be N×N. Also, the coding unit of the current depth having the size of 2N×2N may include 4 of the coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth both determined considering characteristics of the current picture. Also, since encoding may be performed on each maximum coding unit by using any of various prediction modes and transformations, an optimum encoding mode may be determined considering characteristics of the coding unit of various image sizes.

Thus, if an image having a high resolution or a large amount of data is encoded in units of related art macroblocks, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100 according to an exemplary embodiment, image compression efficiency may be increased since a coding unit is adjusted while considering characteristics of an image while increasing a maximum size of a coding unit while considering a size of the image.

Figure 2:
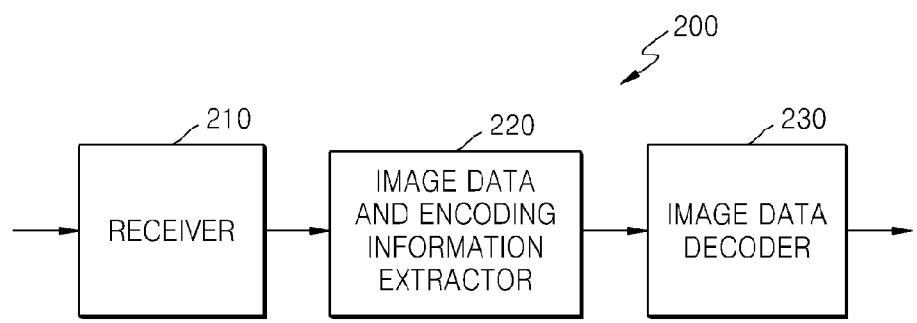
FIG. 2 is a block diagram of an apparatus for decoding a video, according to an exemplary embodiment.

FIG. 2 is a block diagram of a video decoding apparatus 200, according to an exemplary embodiment. Referring to FIG. 2, the video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are the same or similar to those described above with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture from a header corresponding to the current picture or an SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. Thus, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth. Furthermore, the information about the encoding mode may include at least one of information about a partition type of a corresponding coding unit corresponding to the coded depth, information about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include at least one of a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit for each coding unit corresponding to the coded depth, and output the image data of the current maximum coding unit.

In other words, data units including the encoding information including the same split information may be gathered by observing the encoding information set assigned for the predetermined data unit from among the coding unit, the prediction unit, and the minimum unit. Moreover, the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, a maximum size of the coding unit may be determined considering resolution and an amount of image data.

Accordingly, even if image data has a high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to one or more exemplary embodiments will now be described with reference to FIGS. 3 through 13.

Figure 3:
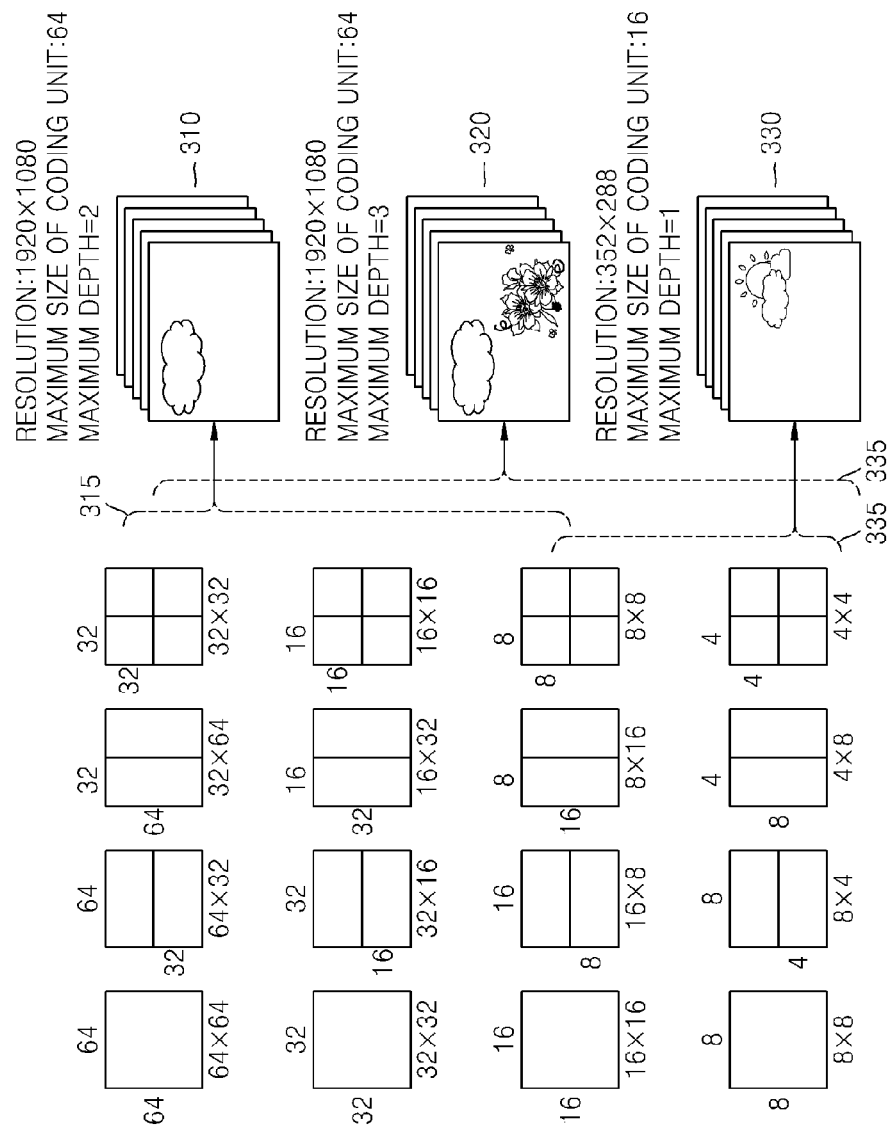
FIG. 3 is a diagram for describing a concept of coding units according to an exemplary embodiment.

FIG. 3 is a diagram for describing a concept of coding units according to an exemplary embodiment. A size of a coding unit may be expressed in width×height, and may be 64×64, 32×32, 16×16, and 8×8, though it is understood that another exemplary embodiment is not limited thereto. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

Referring to FIG. 3, first video data 310 has a resolution of 1920×1080, a maximum size of a coding unit of 64, and a maximum depth of 2. Second video data 320 has a resolution of 1920×1080, a maximum size of a coding unit of 64, and a maximum depth of 3. Third video data 330 has a resolution of 352×288, a maximum size of a coding unit of 16, and a maximum depth of 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding units of the first and second video data 310 and 320 having a higher resolution than the third video data 330 may be 64.

Since the maximum depth of the first video data 310 is 2, coding units 315 of the first video data 310 may include a maximum coding unit having a long axis size of 64, and coding units having long axis sizes of 32 and 16 since depths are deepened to two layers by splitting the maximum coding unit twice. Meanwhile, since the maximum depth of the third video data 330 is 1, coding units 335 of the third video data 330 may include a maximum coding unit having a long axis size of 16, and coding units having a long axis size of 8 since depths are deepened to one layer by splitting the maximum coding unit once.

Since the maximum depth of the second video data 320 is 3, coding units 325 of the second video data 320 may include a maximum coding unit having a long axis size of 64, and coding units having long axis sizes of 32, 16, and 8 since the depths are deepened to 3 layers by splitting the maximum coding unit three times. As a depth deepens (i.e., increases), detailed information may be precisely expressed.

Figure 4:
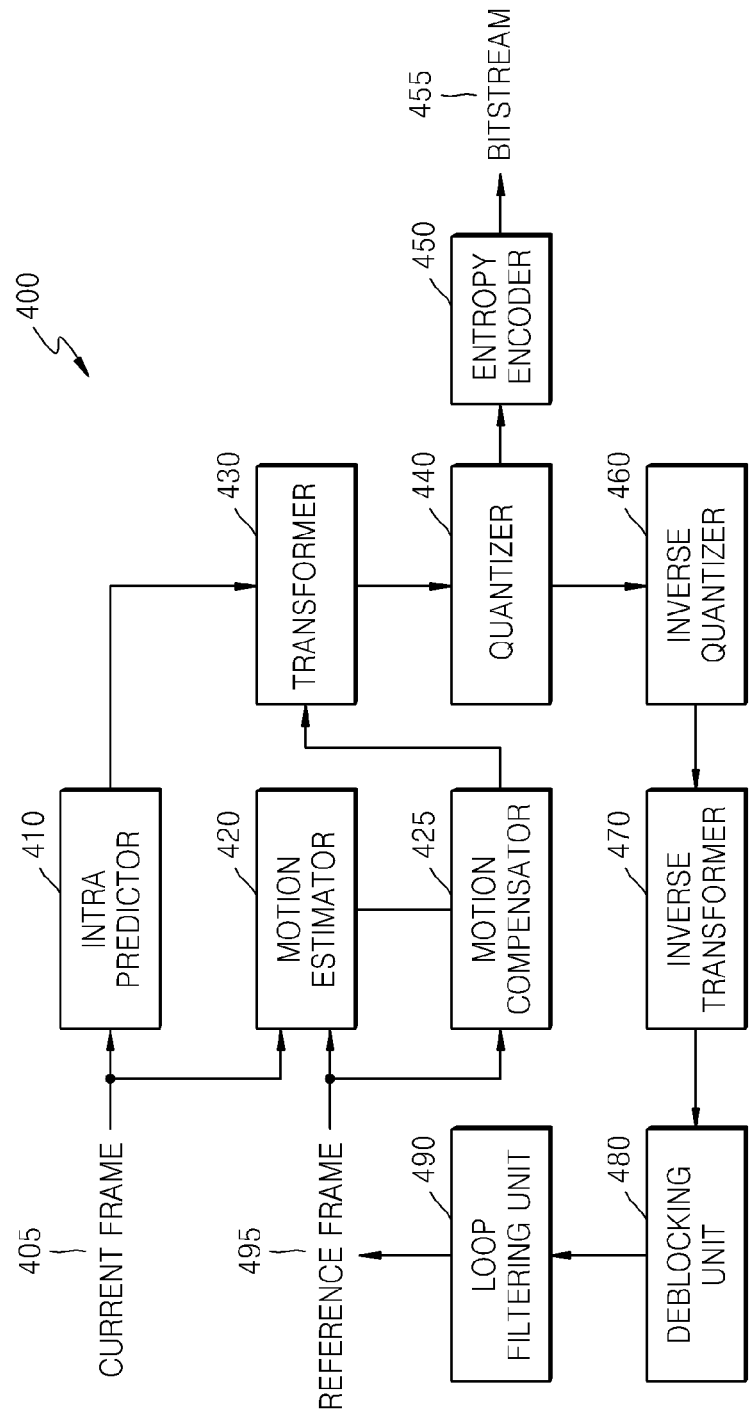
FIG. 4 is a block diagram of an image encoder based on coding units according to an exemplary embodiment.

FIG. 4 is a block diagram of an image encoder 400 based on coding units, according to an exemplary embodiment. Referring to FIG. 4, the image encoder 400 performs operations of the coding unit determiner 120 of the video encoding apparatus 100 to encode image data. For example, an intra predictor 410 performs intra prediction on coding units in an intra mode, from among a current frame 405, and a motion estimator 420 and a motion compensator 425 perform inter estimation and motion compensation, respectively, on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470. The restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering a maximum size and a maximum depth of a current maximum coding unit, and the transformer 430 determines a size of the transformation unit in each coding unit from among the coding units having a tree structure.

Figure 5:
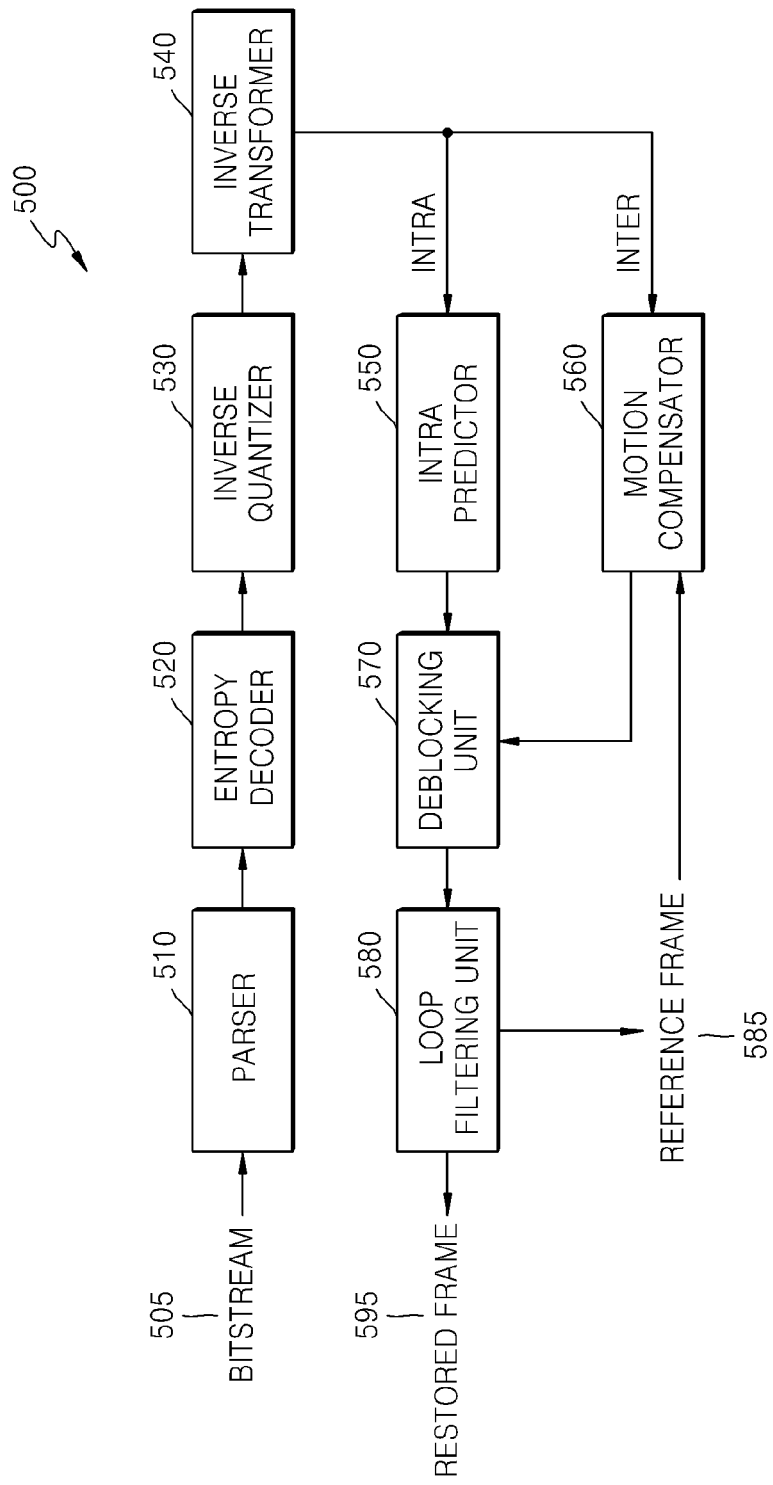
FIG. 5 is a block diagram of an image decoder based on coding units according to an exemplary embodiment.

FIG. 5 is a block diagram of an image decoder 500 based on coding units, according to an exemplary embodiment. Referring to FIG. 5, a parser 510 parses encoded image data to be decoded and information about encoding used for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each maximum coding unit.

Specifically, the intra predictor 550 and the motion compensator 560 determine partitions and a prediction mode for each of the coding units having a tree structure, and the inverse transformer 540 need to determine a size of a transformation unit for each coding unit.

Figure 6:
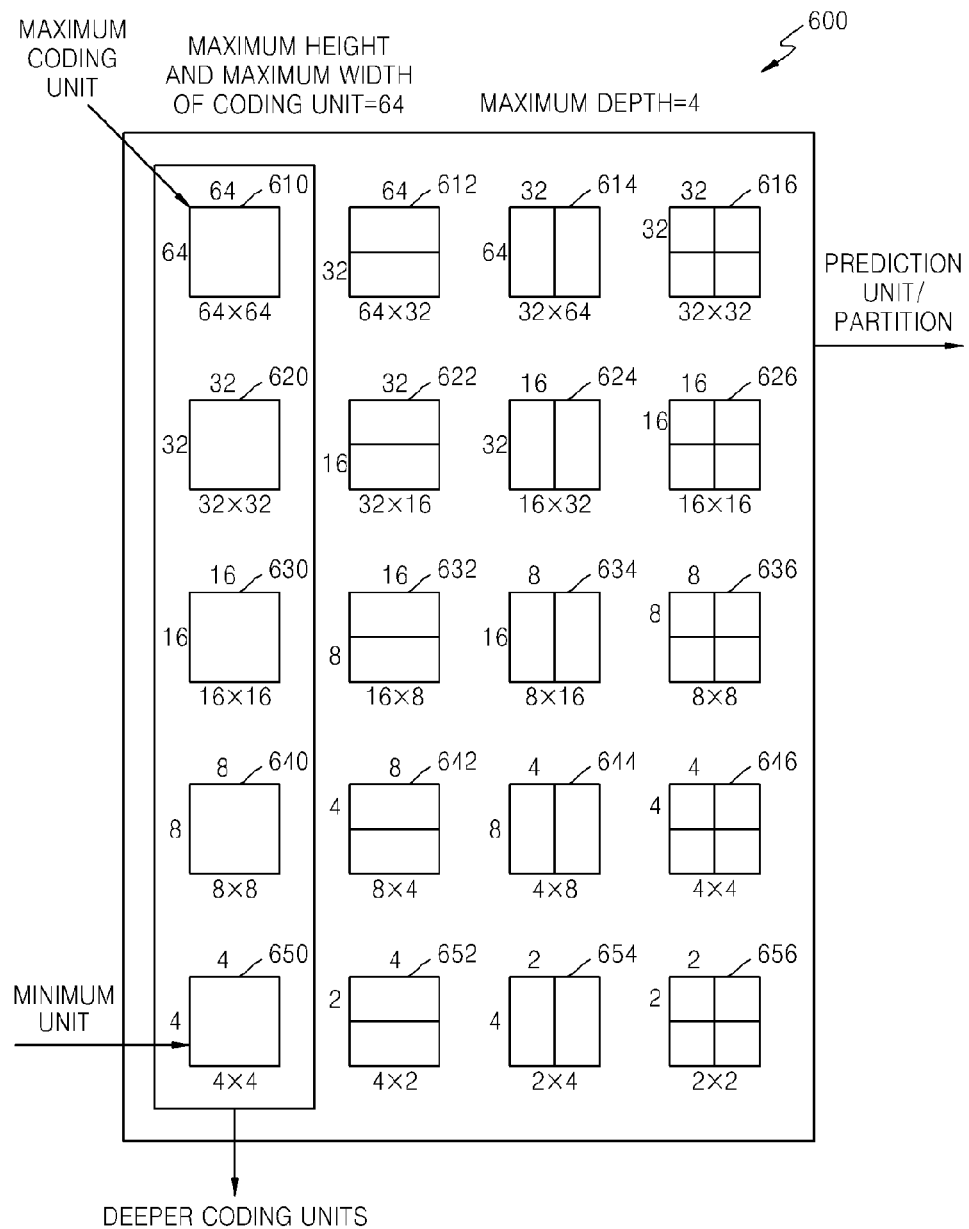
FIG. 6 is a diagram illustrating deeper coding units according to depths and prediction units according to an exemplary embodiment.

FIG. 6 is a diagram illustrating deeper coding units according to depths, and partitions, according to an exemplary embodiment. A video encoding apparatus 100 according to an exemplary embodiment and a video decoding apparatus 200 according to an exemplary embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to a predetermined maximum size of the coding unit.

Referring to FIG. 6, in a hierarchical structure 600 of coding units, according to an exemplary embodiment, the maximum height and the maximum width of the coding units are each 64, and the maximum depth is 4. Since a depth deepens (i.e., increases) along a vertical axis of the hierarchical structure 600, a height and a width of the deeper coding units are each split. Also, a prediction unit and partitions, which are bases for prediction encoding of each deeper coding unit, are shown along a horizontal axis of the hierarchical structure 600.

For example, a first coding unit 610 is a maximum coding unit in the hierarchical structure 600, wherein a depth thereof is 0 and a size, i.e., a height by width, thereof is 64×64. The depth deepens along the vertical axis such that the hierarchical structure 600 includes a second coding unit 620 having a size of 32×32 and a depth of 1, a third coding unit 630 having a size of 16×16 and a depth of 2, a fourth coding unit 640 having a size of 8×8 and a depth of 3, and a fifth coding unit 650 having a size of 4×4 and a depth of 4. The fifth coding unit 650 having the size of 4×4 and the depth of 4 is a minimum coding unit.

The prediction unit and the partitions of the coding units 610, 620, 630, 640, and 650 are arranged along the horizontal axis according to each depth. In other words, if the first coding unit 610 having the size of 64×64 and the depth of 0 is a prediction unit, the prediction unit may be split into partitions included in the first coding unit 610, i.e. a partition 610 having a size of 64×64, partitions 612 having a size of 64×32, partitions 614 having the size of 32×64, or partitions 616 having a size of 32×32.

Similarly, a prediction unit of the second coding unit 620 having the size of 32×32 and the depth of 1 may be split into partitions included in the second coding unit 620, i.e. a partition 620 having a size of 32×32, partitions 622 having a size of 32×16, partitions 624 having a size of 16×32, and partitions 626 having a size of 16×16.

Similarly, a prediction unit of the third coding unit 630 having the size of 16×16 and the depth of 2 may be split into partitions included in the third coding unit 630, i.e., a partition having a size of 16×16 included in the third coding unit 630, partitions 632 having a size of 16×8, partitions 634 having a size of 8×16, and partitions 636 having a size of 8×8.

Similarly, a prediction unit of the fourth coding unit 640 having the size of 8×8 and the depth of 3 may be split into partitions included in the fourth coding unit 640, i.e. a partition having a size of 8×8 included in the fourth coding unit 640, partitions 642 having a size of 8×4, partitions 644 having a size of 4×8, and partitions 646 having a size of 4×4.

The fifth coding unit 650 having the size of 4×4 and the depth of 4 is the minimum coding unit and a coding unit of the lowermost depth. A prediction unit of the fifth coding unit 650 is assigned to a partition having a size of 4×4. Alternatively, the prediction unit of the fifth coding unit 650 may be split into a partition having a size of 4×4 included in the fifth coding unit 650, partitions 652 each having a size of 4×2, partitions 654 each having a size of 2×4, and partitions 656 each having a size of 2×2.

In order to determine the at least one coded depth of the coding units of the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a minimum encoding error may be selected for the current depth by performing encoding for each prediction unit in the coding units corresponding to the current depth, along the horizontal axis of the hierarchical structure 600. Alternatively, the minimum encoding error may be searched for by comparing the minimum encoding errors according to depths, by performing encoding for each depth as the depth deepens along the vertical axis of the hierarchical structure 600. A depth and a partition having the minimum encoding error in the first coding unit 610 may be selected as the coded depth and a partition type of the first coding unit 610.

FIG. 7 is a diagram for describing a relationship between a coding unit 710 and transformation units 720, according to an exemplary embodiment. The video encoding apparatus 100 according to an exemplary embodiment and a video decoding apparatus 200 according to an exemplary embodiment encodes and decodes, respectively, an image according to coding units having sizes smaller than or equal to a maximum coding unit for each maximum coding unit. Sizes of transformation units for transformation during encoding may be selected based on data units that are not larger than a corresponding coding unit.

Referring to FIG. 7, for example, in the video encoding apparatus 100, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding errors may be selected.

FIG. 8 is a diagram for describing encoding information of coding units corresponding to a coded depth, according to an exemplary embodiment. Referring to FIG. 8, the output unit 130 of a video encoding apparatus 100 according to an exemplary embodiment may encode and transmit first information 800 about a partition type, second information 810 about a prediction mode, and third information 820 about a size of a transformation unit for each coding unit corresponding to a coded depth, as information about an encoding mode.

The first information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the first information 800 about a partition type is set to indicate one of the partition 804 having a size of 2N×N, the partition 806 having a size of N×2N, and the partition 808 having a size of N×N.

The second information 810 indicates a prediction mode of each partition. For example, the second information 810 may indicate a mode of prediction encoding performed on a partition indicated by the first information 800, i.e., an intra mode 812, an inter mode 814, or a skip mode 816.

The third information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

An image data and encoding information extractor 220 of a video decoding apparatus 200 according to an exemplary embodiment may extract and use the information 800, 810, and 820 for decoding, according to each deeper coding unit.

Figure 9:
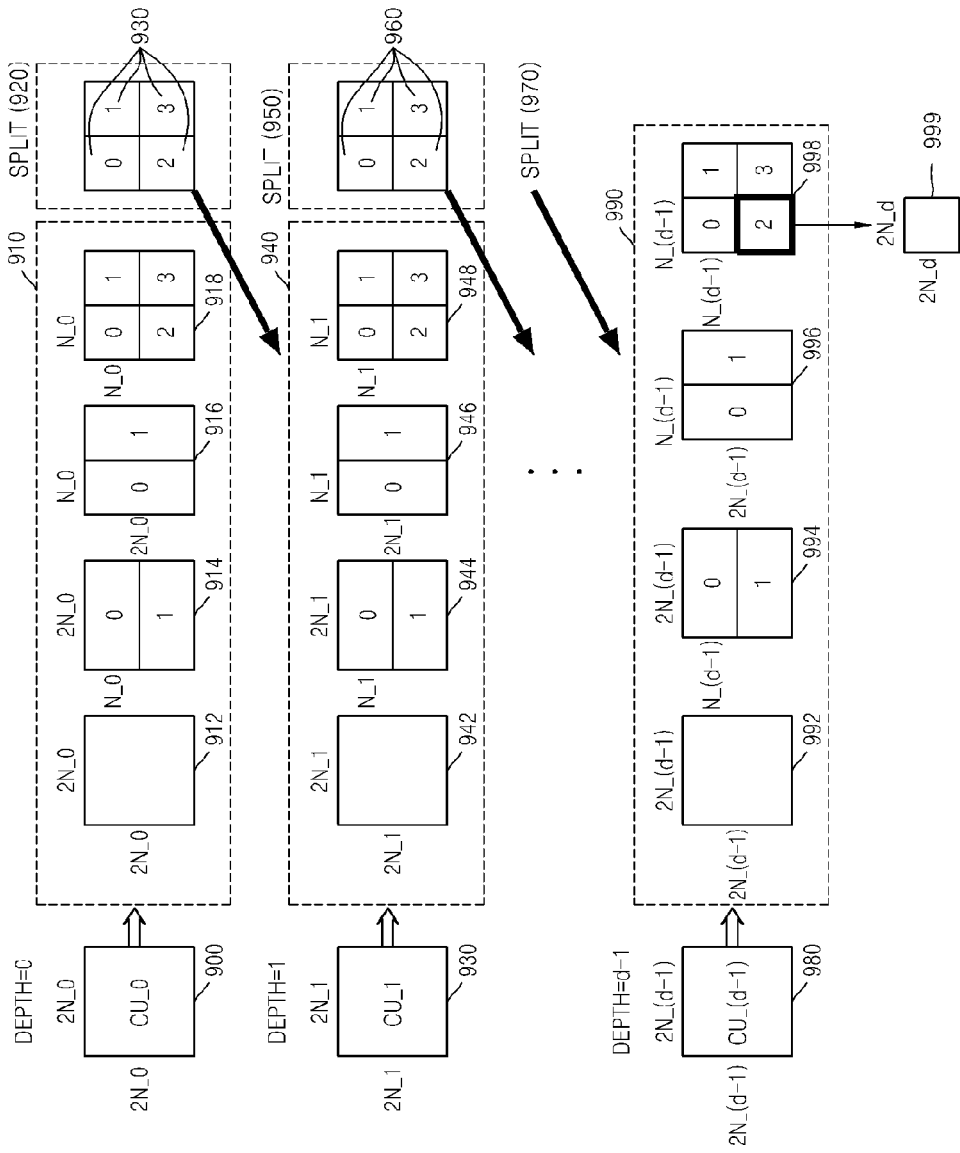
FIG. 9 is a diagram of deeper coding units according to depths, according to an exemplary embodiment.

FIG. 9 is a diagram of deeper coding units according to depths, according to an exemplary embodiment. Split information may be used to indicate a change of a depth. The spilt information indicates whether a coding unit of a current depth is split into coding units of a lower depth.

Referring to FIG. 9, a prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×N_0, and a partition type 918 having a size of N_0× N_0. FIG. 9 only illustrates the partition types 912 through 918 which are obtained by symmetrically splitting the prediction unit 910, but it is understood that a partition type is not limited thereto in another exemplary embodiment. For example, according to another exemplary embodiment, the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0× N_0, and four partitions having a size of N_0×N_0, according to each partition type. The prediction encoding in an intra mode and an inter mode may be performed on the partitions having the sizes of 2N_0×2N_0, N_0×N_0, 2N_0×N_0, and N_0×N_0. The prediction encoding in a skip mode is performed only on the partition having the size of 2N_0× 2N_0.

Errors of encoding including the prediction encoding in the partition types 912 through 918 are compared, and the minimum encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0× N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1× N_1.

If an encoding error is the smallest in the partition type 948, a depth is changed from 1 to 2 to split the partition type 948 in operation 950, and encoding is repeatedly performed on coding units 960, which have a depth of 2 and a size of N_2× N_2 to search for a minimum encoding error.

When a maximum depth is d, split operations according to each depth may be performed up to when a depth becomes d−1, and split information may be encoded up to when a depth is one of 0 to d−2. For example, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_ (d−1), a partition type 994 having a size of 2N_(d−1)×N_(d− 1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit $CU_{13}$ (d−1) having a depth of d−1 is no longer split to a lower depth, and a coded depth for the coding units of a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be considered a minimum unit for the current maximum coding unit. A minimum unit according to an exemplary embodiment may be a rectangular data unit obtained by splitting a minimum coding unit 980 by 4. By performing the encoding repeatedly, a video encoding apparatus 100 according to an exemplary embodiment may select a depth having the minimum encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding errors may be determined as a coded depth. At least one of the coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth are set to 1.

An image data and encoding information extractor 220 of a video decoding apparatus 200 according to an exemplary embodiment may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
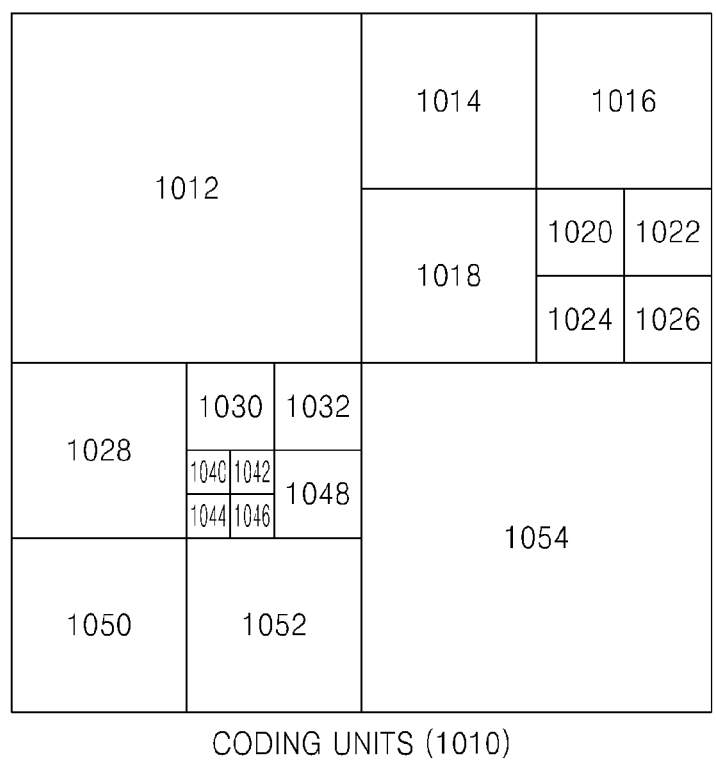
FIGS. 10, 11 and 12 are diagrams for describing a relationship between coding units, prediction units, and frequency transformation units, according to an exemplary embodiment.
Figure 11:
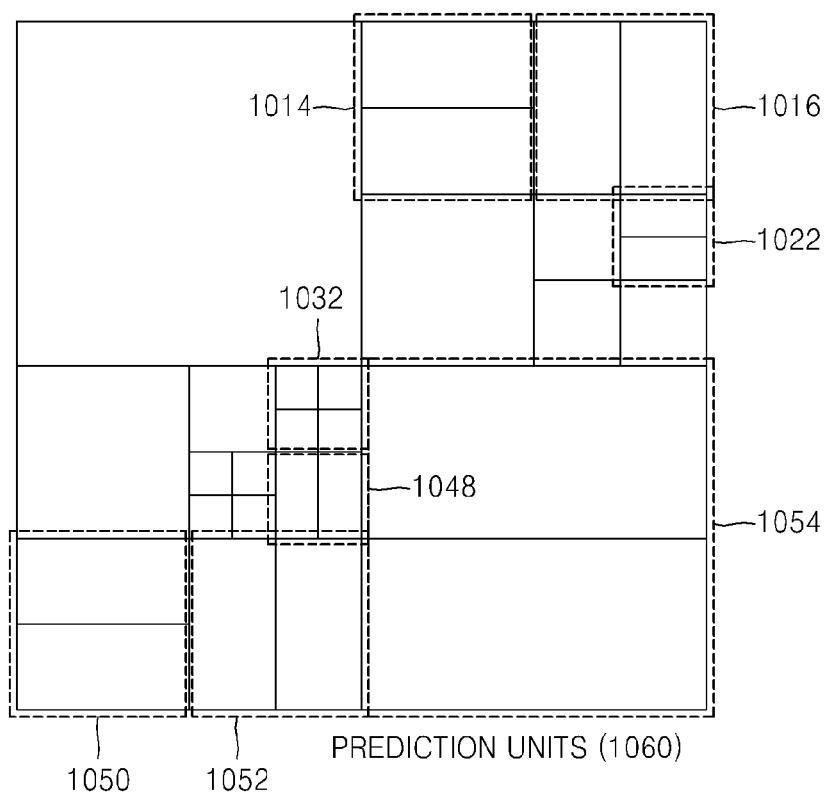
Figure 12:
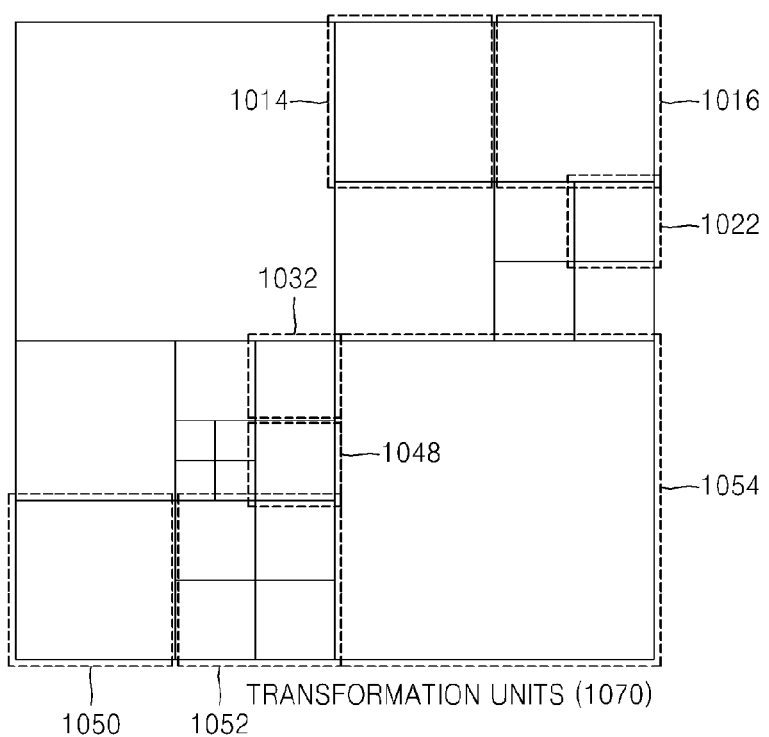

FIGS. 10 through 12 are diagrams for describing a relationship between coding units 1010, prediction units 1060, and transformation units 1070, according to an exemplary embodiment.

Referring to FIGS. 10 through 12, the coding units 1010 are coding units having a tree structure, corresponding to coded depths determined by a video encoding apparatus 100 according to an exemplary embodiment, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units of the coding units 1010. For example, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. For example, video encoding and decoding apparatuses 100 and 200 according to exemplary embodiments may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include at least one of split information about a coding unit, information about a partition type, information about a prediction mode, and information about a size of a transformation unit. Table 1 shows exemplary encoding information that may be set by the video encoding and decoding apparatuses 100 and 200.

TABLE 1

Split Information 0
(Encoding on Coding Unit having Size of 2N × 2N and Current Depth of d)

| | Partition Type | | Size of Transformation Unit | | Split Information 1 |
|---|---|---|---|---|---|
| Prediction Mode | Symmetrical Partition Type | Asymmetrical Partition Type | Split Information 0 of Transformation Unit | Split Information 1 of Transformation Unit | |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth in which a current coding unit is no longer split into a lower depth is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, N×2N, and N×N, which are obtained by symmetrically splitting at least one of a height and a width of a prediction unit, and asymmetrical partition types having sizes of 2N×nU, 2N×nD, nL×2N, and nR×2N, which are obtained by asymmetrically splitting at least one of the height and the width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. For example, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit including the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Therefore, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 13:
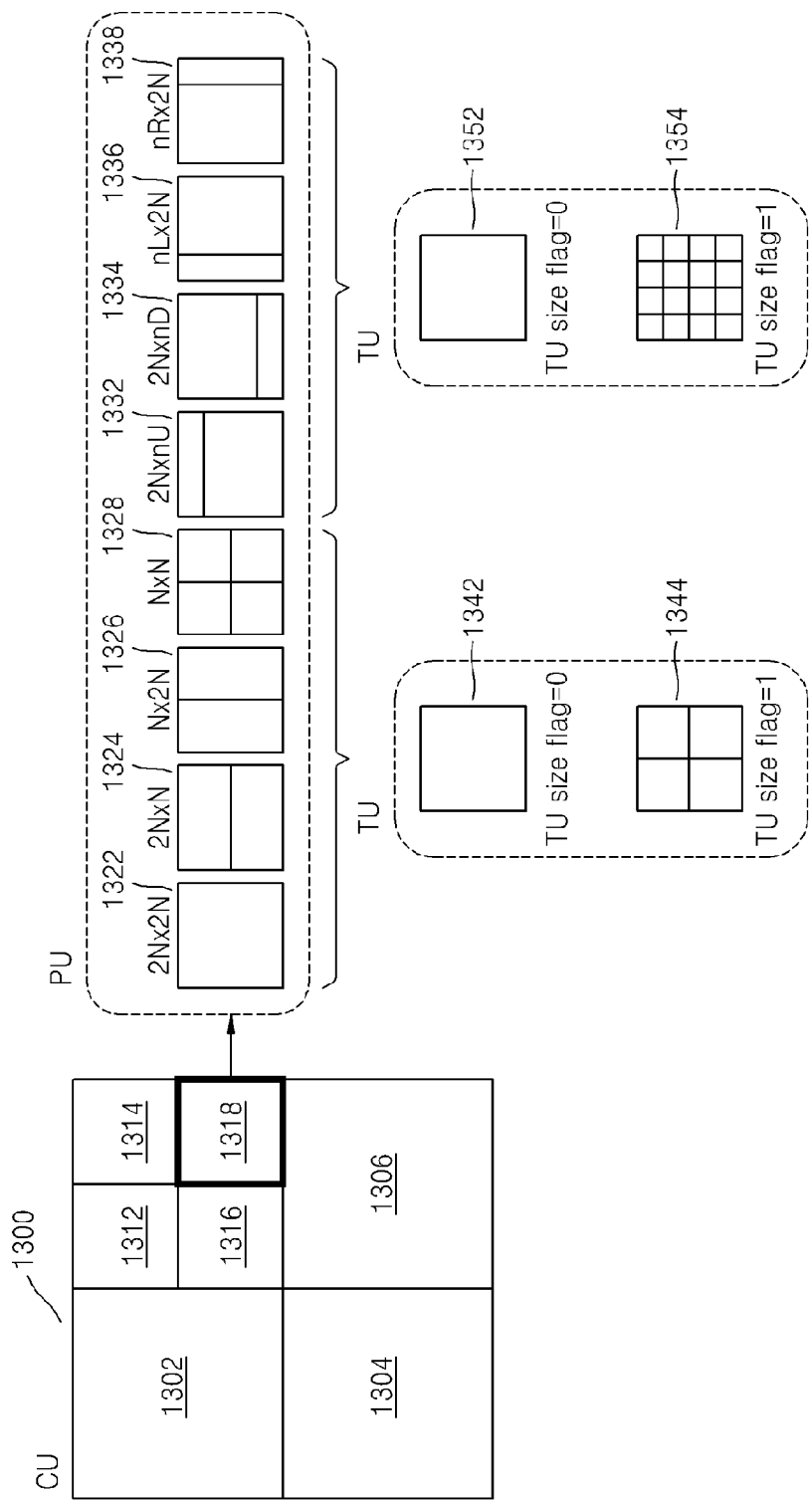
FIG. 13 illustrates a diagram for describing a relationship between a coding unit, a prediction unit or a partition, and a transformation unit, according to encoding mode information of Table 1 according to an exemplary embodiment.

FIG. 13 is a diagram for describing a relationship between a coding unit, a prediction unit or a partition, and a transformation unit, according to encoding mode information of Table 1 according to an exemplary embodiment. Referring to FIG. 13, a maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, or a partition type 1338 having a size of nR×2N.

When the partition type is set to be symmetrical, i.e., the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value or 0 or 1, though it is understood that another exemplary embodiment is not limited to a 1-bit flag, and a transformation unit may be hierarchically split having a tree structure while the TU size flag increases from 0 in another exemplary embodiment.

In this case, when the TU size flag is used together with a maximum size of a transformation unit and a minimum size thereof, the size of an actually used transformation unit may be represented. The video encoding apparatus 100 may encode size information of a maximum transformation unit, size information of a minimum transformation unit, and maximum split information of a transformation unit. The encoded size information of the maximum transformation unit, the encoded size information of the minimum transformation unit, and the maximum split information of a transformation unit may be inserted into the SPS. The video decoding apparatus 200 may perform video decoding by using the size information of the maximum transformation unit, the size information of the minimum transformation unit, and the maximum split information of a transformation unit.

For example, when a current coding unit has a size of 64×64, a maximum transformation unit has a size of 32×32, and a TU size flag is 0, a transformation unit may be set to have a size of 32×32. When the current encoding unit has a size of 64×64, the maximum transformation unit has a size of 32×32, and the TU size flag is 1, the transformation unit may be set to have a size of 16×16. When the current encoding unit has a size of 64×64, the maximum transformation unit has a size of 32×32, and the TU size flag is 2, the transformation unit may be set to have a size of 8×8.

For example, when the current coding unit has a size of 32×32, a minimum transformation unit has a size of 32×32, and the TU size flag is 0, the transformation unit may be set to have a size of 32×32. Since the size of the transformation unit cannot be smaller than 32×32, no TU size flags can be set.

For example, when the current encoding unit has a size of 64×64 and maximum split information of a transformation unit is 1, the TU size flag may be 0 or 1, and other TU size flag cannot be set.

Accordingly, when the maximum split information of a transformation unit is defined as 'MaxTransformSizeIndex', the size of the minimum transformation unit is defined as 'MinTransformSize', and the size of a transformation unit when the TU size flag is 0 is defined as 'RootTuSize', a minimum transformation unit size possible at a current coding unit, 'CurrMinTuSize', may be defined as the following Equation (1):

$$\text{CurrMinTuSize}=\max(\text{MinTransformSize}, \text{RootTuSize}/(2^{\text{MaxTransformSizeIndex}})) \quad (1)$$

In comparison with the minimum transformation unit size possible at a current coding unit, 'CurrMinTuSize', the transformation unit size when the TU size flag is 0, 'RootTuSize', may represent a maximum transformation unit size that can be employed by a system. In other words, according to the Equation (1), since 'RootTuSize/(2^MaxTransformSizeIndex)' denotes a transformation unit size obtained by splitting the transformation unit size when the TU size flag is 0, 'RootTuSize', by a number of times corresponding to the maximum split information of a transformation unit, and 'MinTransformSize' denotes a minimum transformation unit size, a smaller size from among the two sizes may be the minimum transformation unit size possible at the current coding unit, 'CurrMinTuSize'. In an exemplary embodiment, Equation (1) above and equations hereinafter are relationship equations.

The current maximum transformation unit size RootTuSize may vary depending on the type of prediction mode.

For example, when a current prediction mode is an inter mode, RootTuSize may be determined according to Equation (2) below, where 'MaxTransformSize' indicates a maximum transformation unit size and 'PUSize' indicates a current prediction unit size:

$$RootTuSize = \min(MaxTransformSize, PUSize) \quad (2)$$

In other words, when the current prediction mode is an inter mode, the transformation unit size when the TU size flag is 0, 'RootTuSize', may be set to be a smaller size from among the maximum transformation unit size and the current prediction unit size.

When a prediction mode of a current partition unit is an intra mode, 'RootTuSize' may be determined according to Equation (3) below, where 'PartitionSize' indicates the size of the current partition unit:

$$RootTuSize = \min(MaxTransformSize, PartitionSize) \quad (3)$$

In other words, when the current prediction mode is an intra mode, the transformation unit size when the TU size flag is 0, 'RootTuSize', may be set to be a smaller size from among the maximum transformation unit size and the current partition unit size.

However, it should be noted that a current maximum transformation unit size 'RootTuSize' that varies according to the prediction mode of a partition unit is only an exemplary, and that a factor for determining the current maximum transformation unit size 'RootTuSize' is not limited thereto in another exemplary embodiment.

Figure 14:
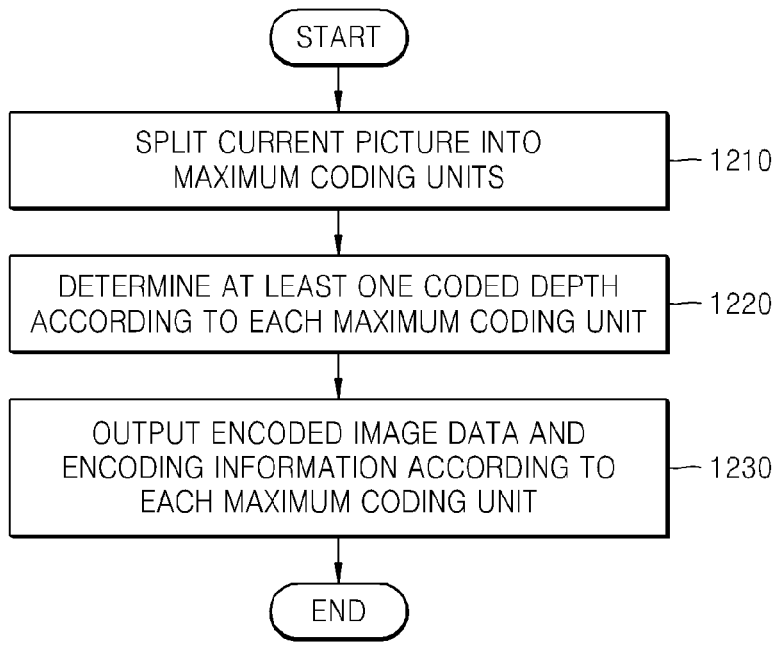
FIG. 14 is a flowchart illustrating a method of encoding a video, according to an exemplary embodiment.

FIG. 14 is a flowchart illustrating a method of encoding a video, according to an exemplary embodiment.

Referring to FIG. 14, in operation 1210, a current picture is split into at least one maximum coding unit. A maximum depth indicating a total number of possible splitting splits may be set in advance.

In operation 1220, at least one split region obtained by splitting a region of the maximum coding unit according to depths is encoded, so that a coded depth to output a final encoding result is determined for each at least one split region and a coding unit according to a tree structure is determined.

The maximum coding unit is spatially split whenever the depth deepens, and thus is split into coding units of a lower depth. Each coding unit may be split into coding units of another lower depth by being spatially split independently from adjacent coding units. Encoding is repeatedly performed on each coding unit according to depths.

Also, partition types and transformation units having a minimum encoding error are determined for each deeper coding unit. In order to determine a coded depth having a minimum encoding error in each maximum coding unit, encoding errors may be measured and compared in all deeper coding units according to depths.

In operation 1230, image data being a final result of the encoding of at least one split region is output, with encoded information about a coded depth and an encoding mode. The encoded information about the encoding mode may include information about a coded depth or split information, information about a partition type of a prediction unit, a prediction mode, and a size of a transformation unit. The encoded information about the encoding mode may be transmitted to a decoder with the encoded image data.

Figure 15:
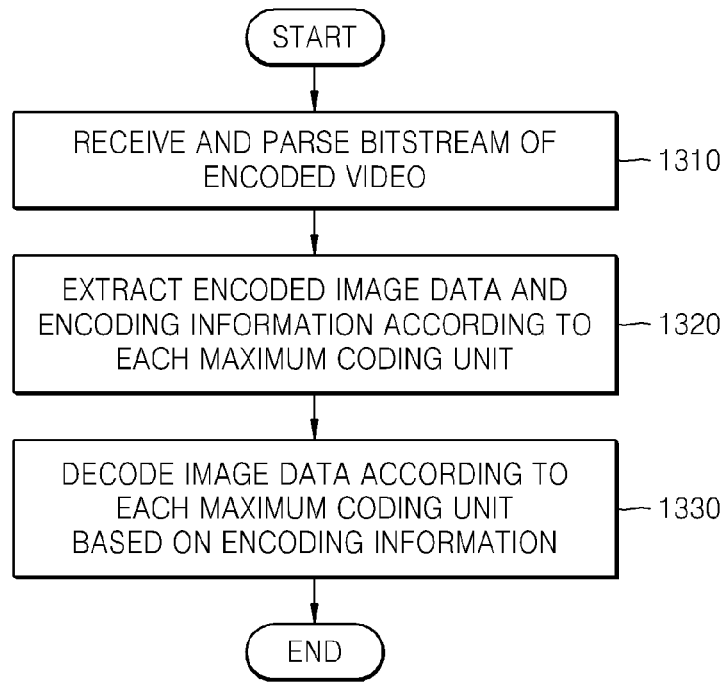
FIG. 15 is a flowchart illustrating a method of decoding a video, according to an exemplary embodiment.

FIG. 15 is a flowchart illustrating a method of decoding a video, according to an exemplary embodiment.

Referring to FIG. 15, in operation 1310, a bitstream of an encoded video is received and parsed.

In operation 1320, encoded image data of a current picture assigned to a maximum coding unit is acquired from the parsed bitstream, and information about a coded depth and an encoding mode according to maximum coding units are extracted from the parsed bitstream. The coded depth of each maximum coding unit is a depth having a minimum encoding error in each maximum coding unit. In encoding each maximum coding unit, the image data is encoded based on at least one data unit obtained by hierarchically splitting each maximum coding unit according to depths.

According to the information about the coded depth and the encoding mode, the maximum coding unit may be split into coding units having a tree structure. Each of the coding units having the tree structure is determined as a coding unit corresponding to a coded depth, and is optimally encoded as to output the minimum encoding error. Accordingly, encoding and decoding efficiency of an image may be improved by decoding each piece of encoded image data in the coding units having a tree structure after determining at least one coded depth according to coding units.

In operation 1330, the encoded image data of each maximum coding unit is decoded based on the information about a coded depth and an encoding mode according to maximum coding units. The decoded image data may be reproduced by a reproducing apparatus, stored in a storage medium, or transmitted through a network according to one or more exemplary embodiments.

A method and apparatus for encoding a video based on a scanning order of hierarchical data units and a method and apparatus for decoding a video based on a scanning order of hierarchical data units according to exemplary embodiments will now be described in detail with reference to FIGS. 16 to 31.

Figure 16:
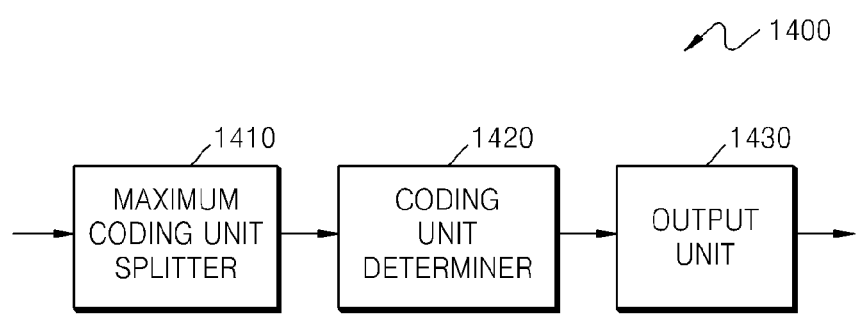
FIG. 16 is a block diagram of an apparatus for encoding a video based on a scanning order of hierarchical data units, according to an exemplary embodiment.

FIG. 16 is a block diagram of a video encoding apparatus 1400 based on a scanning order of hierarchical data units, according to an exemplary embodiment.

The video encoding apparatus 1400 based on the scanning order of hierarchical data units includes a maximum coding unit splitter 1410, a coding unit determiner 1420, and an output unit 1430. Since the video encoding apparatus 1400 based on the scanning order of hierarchical data units is an exemplary embodiment of the video encoding apparatus 100, the maximum coding unit splitter 110, the coding unit determiner 120, and the output unit 130 of the video encoding apparatus 100 may correspond to the maximum coding unit splitter 1410, the coding unit determiner 1420, and the output unit 1430, respectively.

The maximum coding unit splitter 1410 splits a picture of an input image into maximum coding units each having a predetermined size, and image data of each maximum coding unit is output to the coding unit determiner 1420.

The coding unit determiner 1420 hierarchically splits the regions of the maximum coding units received from the maximum coding unit splitter 1410 as the depth deepens, and performs encoding based on deeper coding units according to depths corresponding to numbers of splitting times independently on the hierarchically split regions.

Encoding based on each deeper coding unit includes prediction based on prediction units of shapes and sizes smaller or equal to the deeper coding unit, and transformation based on transformation units of sizes smaller than or equal to the deeper coding unit.

Accordingly, the coding unit determiner 1420 may determine at least one coded depth where a result of the encoding is to be output, the partition type of a coding unit having the coded depth, a prediction mode, the size of a transformation unit, etc. Pieces of information associated with the coding unit having the coded depth determined in this way may be determined as information about the encoding mode.

To determine, for each independent region of a maximum coding unit, a coded depth where the encoding result is to be output and a coding mode associated with the coded depth, the coding unit determiner 1420 may search for at least one coded depth of coding units in which the fewest encoding errors occur, from among the deeper coding units according to the depths.

According to an exemplary embodiment, the order of encoding the maximum coding units is a raster scanning order. Coding units according to hierarchical depths in a maximum coding unit may be scanned in the zigzag scanning order among deeper coding units corresponding to the same depth. The order of encoding the minimum units included in a maximum coding unit may be a zigzag scanning order or a raster scanning order.

A relationship between an upper coding unit and a lower coding unit from among the deeper coding units included in the maximum coding unit according to the zigzag scanning order will now be illustrated. A relative location of a predetermined lower coding unit with respect to an upper coding unit may be represented as an index of the predetermined lower coding unit based on the zigzag scanning order of lower coding units included in the upper coding unit.

Hereinafter, the index of a lower data unit with respect to an upper data unit is interpreted as representing a scanning order based on the zigzag scanning order between lower data units existing on the same level in the upper data unit.

For example, the coding unit determiner 1420 may use the index of a coding unit of a predetermined depth within a maximum coding unit in order to represent relative locations of coding units of a predetermined depth that are included in the maximum coding unit. The coding unit determiner 1420 may use the indices of the minimum units of the maximum coding unit in order to represent the relative locations of the minimum units with respect to the maximum coding unit.

The coding unit determiner 1420 may transform a relative location of a lower data unit defined according to a zigzag scanning order with respect to an upper data unit into an absolute location of the lower data unit on a current picture. Furthermore, the coding unit determiner 1420 may transform the absolute location of the lower data unit on the current picture into the relative location of the lower data unit with respect to the upper data unit defined according to the zigzag scanning order. An example of the absolute location of a predetermined data unit may be a combination of an x coordinate value and a y coordinate value of a pixel on the left upper end of the predetermined data unit on the current picture.

Relative locations between the upper coding units and the lower coding units included in a maximum coding unit may be transformed into each other, based on the hierarchical structure between data units such as a maximum coding unit, deeper coding units, a coding unit of a coded depth, a prediction unit, a minimum unit, and the like.

The coding unit determiner 1420 may determine the relative location of a lower coding unit with respect to a current maximum coding unit by using the relative location of an upper coding unit with respect to the current maximum coding unit. The coding unit determiner 1420 may also determine the absolute location of a lower coding unit of a current picture by using the relative location of the upper coding unit with respect to the current maximum coding unit.

The coding unit determiner 1420 may also determine the relative location of the lower coding unit of the current maximum coding unit by using the absolute location of an upper coding unit on the current picture. The coding unit determiner 1420 may also determine the absolute location of the lower coding unit of the current picture by using the absolute location of the upper coding unit on the current picture.

The coding unit determiner 1420 may use the index of a minimum unit located on the left upper end of each deeper coding unit included in a current maximum coding unit with respect to the current maximum coding unit, in order to define a relationship between an upper coding unit and a lower coding unit from among the deeper coding units. For example, the coding unit determiner 1420 may determine the index of a minimum unit located on the left upper end of a predetermined lower coding unit included in an upper coding unit with respect to a current maximum coding unit, by using the index of a minimum unit located on the left upper end of an upper coding unit with respect to the current maximum coding unit.

The coding unit determiner 1420 may determine the relative locations of the minimum units included in a current prediction unit with respect to the current maximum coding unit by using the relative location of a predetermined coding unit included in the current prediction unit with respect to the current maximum coding unit.

For example, the coding unit determiner 1420 may determine the index of a minimum unit located on the right upper end of the current prediction unit with respect to the current maximum coding unit or the index of a minimum unit located on the left lower end of the current prediction unit with respect to the current maximum coding unit, by using the index of a minimum unit located on the left upper end of the current prediction unit.

The coding unit determiner 1420 may determine a method of determining an index with respect to the current maximum coding unit, based on the partition type and partition index of a coding unit of a coded depth that includes a prediction unit. The partition type may be a symmetrical partition type, such as 2N×2N, 2N×N, N×2N, or N×N, for halving the height or width of a coding unit of a coded depth, or an asymmetrical partition type for asymmetrically splitting the height or width of the coding unit of the coded depth.

Accordingly, the coding unit determiner 1420 may determine the indices of the minimum units included in the current prediction unit with respect to the current maximum coding unit, by using the index of the minimum unit located on the left upper end of the current prediction unit with respect to the current maximum coding unit and the size, the partition type, and the partition index of the coding unit of the coded depth that includes a prediction unit.

The coding unit determiner 1420 may determine the absolute location of a minimum unit on the left upper end of a current coding unit, based on the relative location of the current coding unit with respect to the current maximum coding unit.

The coding unit determiner 1420 may determine the absolute location of the minimum unit on the left upper end of the current prediction unit, based on the relative location of a coding unit of the current prediction unit with respect to the current maximum coding unit.

The coding unit determiner 1420 may refer to neighborhood information of a current data unit in order to encode image data of the current data unit. For example, neighborhood information of an adjacent maximum coding unit, an adjacent coding unit, and the like may be referred to in order to perform prediction encoding on the current maximum coding unit, the current coding unit, or the current prediction unit.

In detail, the neighborhood information of the current maximum coding unit may include a maximum coding unit, a prediction unit, and a minimum unit located on the left side of the current maximum coding unit, a maximum coding unit, a prediction unit, and a minimum unit located on the upper side thereof, a maximum coding unit, a prediction unit, and a minimum unit located on the right upper side thereof, and a maximum coding unit, a prediction unit, and a minimum unit located on the left upper side thereof.

The coding unit determiner 1420 may determine the index of an adjacent minimum unit of the current prediction unit with respect to a corresponding maximum coding unit and usability indicating whether the adjacent minimum unit can be used as reference information, by using the indices of the minimum units included in the current prediction unit, in order to determine reference information for arbitrary directive intra prediction.

For example, the coding unit determiner 1420 may determine whether a prediction unit including the adjacent minimum unit deviates from a current picture, by using the size of the prediction unit based on the absolute location of the current maximum coding unit, the absolute location of the current coding unit, and the partition type and relative location of the current prediction unit. If the adjacent minimum unit or an adjacent prediction unit deviates from the current picture or if the adjacent minimum unit or the adjacent prediction unit does not deviate from the current picture but is not yet accessible data according to the zigzag scanning order, it may be determined that the corresponding neighboring information cannot be used as the reference information.

The coding unit determiner 1420 may determine information about the upper data unit, based on information about the lower data unit. For example, since encoding information including at least one of information about a coding unit of a corresponding depth, information about splitting of the coding unit of the corresponding depth into prediction units, and information about a prediction mode of the prediction units is set for a minimum unit, information regarding a coding unit, a prediction unit, and a maximum coding unit including the minimum unit may be inferred.

The information about the coded depth and the encoding mode associated with the coded depth, determined by the coding unit determiner 1420, are output to the output unit 1430.

The output unit 1430 outputs all information about a coded depth and an encoding mode associated with the coded depth for each maximum coding unit, and encoded video data being a result of the encoding.

Figure 17:
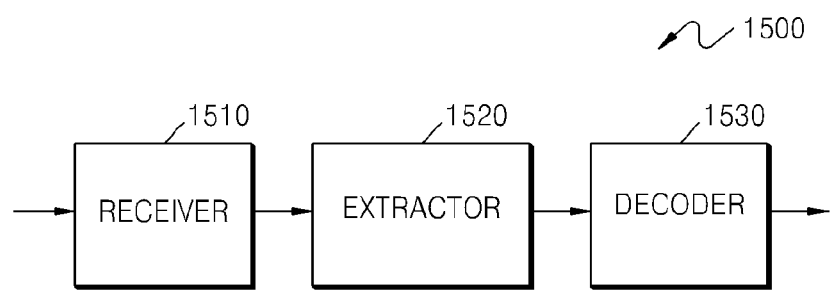
FIG. 17 is a block diagram of an apparatus for decoding a video based on a scanning order of hierarchical data units, according to an exemplary embodiment.

FIG. 17 is a block diagram of a video decoding apparatus 1500 based on a scanning order of hierarchical data units, according to an exemplary embodiment.

Referring to FIG. 17, the video decoding apparatus 1500 based on the scanning order of hierarchical data units includes a receiver 1510, an extractor 1520, and a decoder 1530. The video decoding apparatus 1500 based on the scanning order of hierarchical data units may be an exemplary embodiment of the video decoding apparatus 200 of FIG. 2. The receiver 210, the image data and encoding information extractor 220, and the image data decoder 230 of the video decoding apparatus 200 may correspond to the receiver 1510, the extractor 1520, and the decoder 1530, respectively, of the video decoding apparatus 1500.

The receiver 1510 receives and parses a bitstream for an encoded video.

The extractor 1510 receives the parsed bitstream from the receiver 1520 and extracts information about a coded depth and an encoding mode associated with the coded depth for each maximum coding unit, and encoded video data from the parsed bitstream.

The decoder 1530 receives the information about a coded depth and an encoding mode and the encoded video data from the extractor 1520 and decodes video data encoded for each coding unit of at least one coded depth based on the information about a coded depth and an encoding mode.

Video data restored by the decoding may be transmitted to various reproducible terminals or stored in storage apparatuses.

According to an exemplary embodiment, the order of encoding maximum coding units is a raster scanning order. Coding units according to hierarchical depths included in a maximum coding unit may be scanned in a zigzag scanning order among coding units having the same depth. The order of encoding the minimum units included in a maximum coding unit may be a zigzag scanning order or a raster scanning order.

Similar to the coding unit determiner 1420, the decoder 1530 may mutually transform and search for the absolute locations and relative locations of data units, based on the order of scanning the hierarchical data units.

For example, the decoder 1530 may determine the absolute or relative location of a lower coding unit by using the relative or absolute location of an upper coding unit. The decoder 1530 may determine the index of a minimum unit located on the left upper end of a predetermined lower coding unit included in the upper coding unit with respect to the current maximum coding unit, by using the index of a minimum unit located on the left upper end of the upper coding unit with respect to the current maximum coding unit.

The decoder 1530 may determine the relative locations of the minimum units included in the current prediction unit with respect to the current maximum coding unit by using the relative location of a predetermined minimum unit included in the current prediction unit with respect to the current maximum coding unit. For example, the decoder 1530 may determine the index of a minimum unit located on the right upper end of the current prediction unit with respect to the current maximum coding unit or the index of a minimum unit located on the left lower end of the current prediction unit with respect to the current maximum coding unit, by using the index of a minimum unit located on the left upper end of the current prediction unit.

The decoder 1530 may determine a method of determining the indices of the minimum units of the current prediction unit with respect to the current maximum coding unit, according to the partition type and partition index of a coding unit of a coded depth that includes a prediction unit.

The decoder 1530 may determine the absolute location of a minimum unit on the left upper end of the current coding unit, based on the relative location of the current coding unit with respect to the current maximum coding unit. The decoder 1530 may determine the absolute location of a minimum unit on the left upper end of the current prediction unit, based on the relative location of the current prediction unit with respect to the current maximum coding unit.

The decoder 1530 may analyze the index of an adjacent minimum unit of the current prediction unit with respect to a corresponding maximum coding unit, the usability of the adjacent minimum unit, and the address of an adjacent maximum coding unit, by using the indices of the minimum units included in the current prediction unit according to the zigzag scanning order, in order to determine the reference information for arbitrary directive intra prediction.

For example, the decoder 1530 may determine whether a prediction unit including the adjacent minimum unit deviates from the current picture, by using the size of the prediction unit based on the absolute location of the current maximum coding unit, the absolute location of the current coding unit, and the partition type and relative location of the current prediction unit.

Since encoding information including at least one of information about a coding unit of a corresponding depth, information about splitting of the coding unit of the corresponding depth into prediction units, and information about a prediction mode of the prediction units may be extracted for a minimum unit, the decoder 1530 may predict and use information about a coding unit of the corresponding coded depth, prediction units, and a maximum coding unit including the minimum unit based on the encoding information about the minimum unit.

Accordingly, the video encoding apparatus 1400 based on the scanning order of hierarchical data units and the video decoding apparatus 1500 based on the scanning order of hierarchical data units are capable of accurately and quickly analyzing the locations of various types of data units when using data units relatively larger than existing macroblocks and the various types of data units, by mutually transforming and using the relative locations and absolute locations of the data units based on the scanning order of the hierarchical data units, thereby efficiently encoding or decoding a video.

Figure 18:
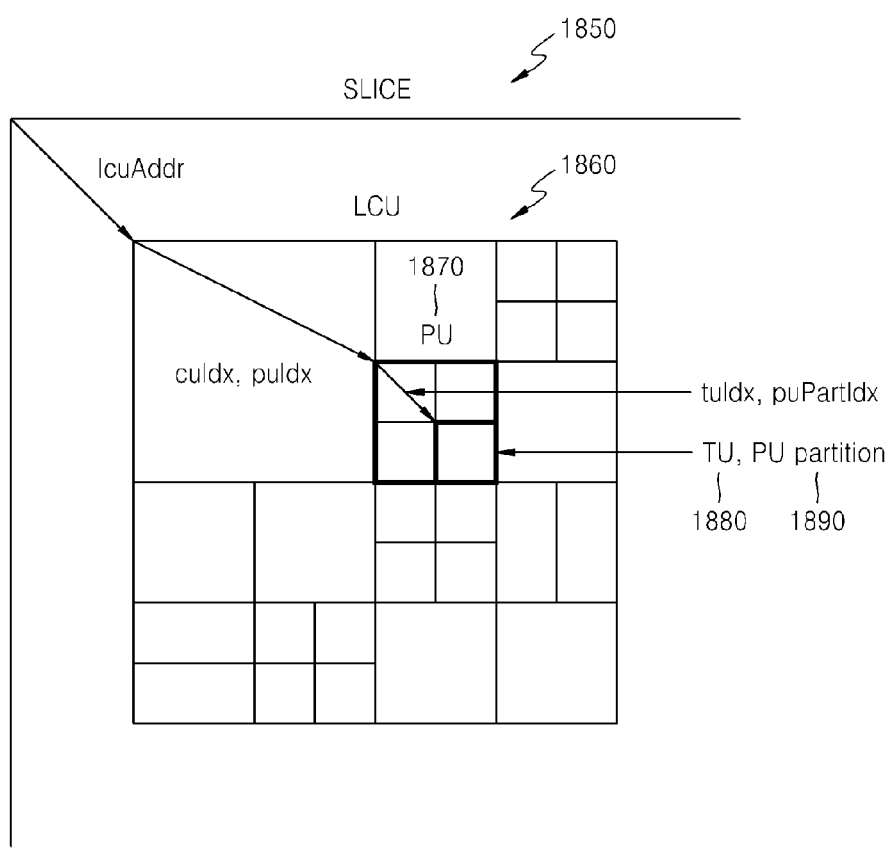
FIG. 18 illustrates a relationship between locations and scan indices of a slice, a coding unit, a prediction unit, a partition, and a transformation unit, according to an exemplary embodiment.

FIG. 18 illustrates a relationship between the locations and scan indices of a slice, a coding unit, a prediction unit, a partition, and a transformation unit according to a hierarchical structure according to an exemplary embodiment.

Referring to FIG. 18, a picture is split into slices, and a slice 1850 includes a plurality of maximum coding units LCUs. A location lcuAddr of a maximum coding unit 1860 from among the maximum coding units LCUs included in the slice 1850 may be expressed as a relative location of a sample on the left upper end of the maximum coding unit 1860 compared to a sample on the left upper end of the slice 1850.

A location of a coding unit 1870 from among coding units having a tree structure in the maximum coding unit 1860 may be expressed as a scan index cuIdx of the coding unit 1870 compared to the sample on the left upper end of the maximum coding unit 1860. If the coding unit 1870 is a coding unit corresponding to a coded depth, that is, a coding unit that is no longer split to a lower depth, the coding unit 1870 becomes a prediction unit 1870, and the location of the prediction unit 1870 may be expressed as a scan index puIdx of the prediction unit 1870 compared to the sample on the left upper end of the maximum coding unit 1860.

The prediction unit 1870 may be split into at least one PU partition. A location of a PU partition 1890 from among the PU partitions of the prediction unit 1870 may be expressed as a scan index puPartIdx of the PU partition 1890 compared to the sample on the left upper end of the prediction unit 1870. The prediction unit 1870 may include at least transformation units TUs. A location of a transformation unit 1880 from among the transformation units of the prediction unit 1870 may be expressed as a scan index tuIdx of the transformation unit 1880 compared to the sample on the left upper end of the prediction unit 1870.

The video encoding apparatus 1400 may use the locations and scan indices of a coding unit, a prediction unit, a partition, and a transformation unit according to an exemplary embodiment described above with reference to FIG. 18, in order to perform video encoding. The video decoding apparatus 1500 may decode encoded data of an image based on coding units having a tree structure, by using the locations and scan indices of a coding unit, a prediction unit, a partition, and a transformation unit.

Figure 19:
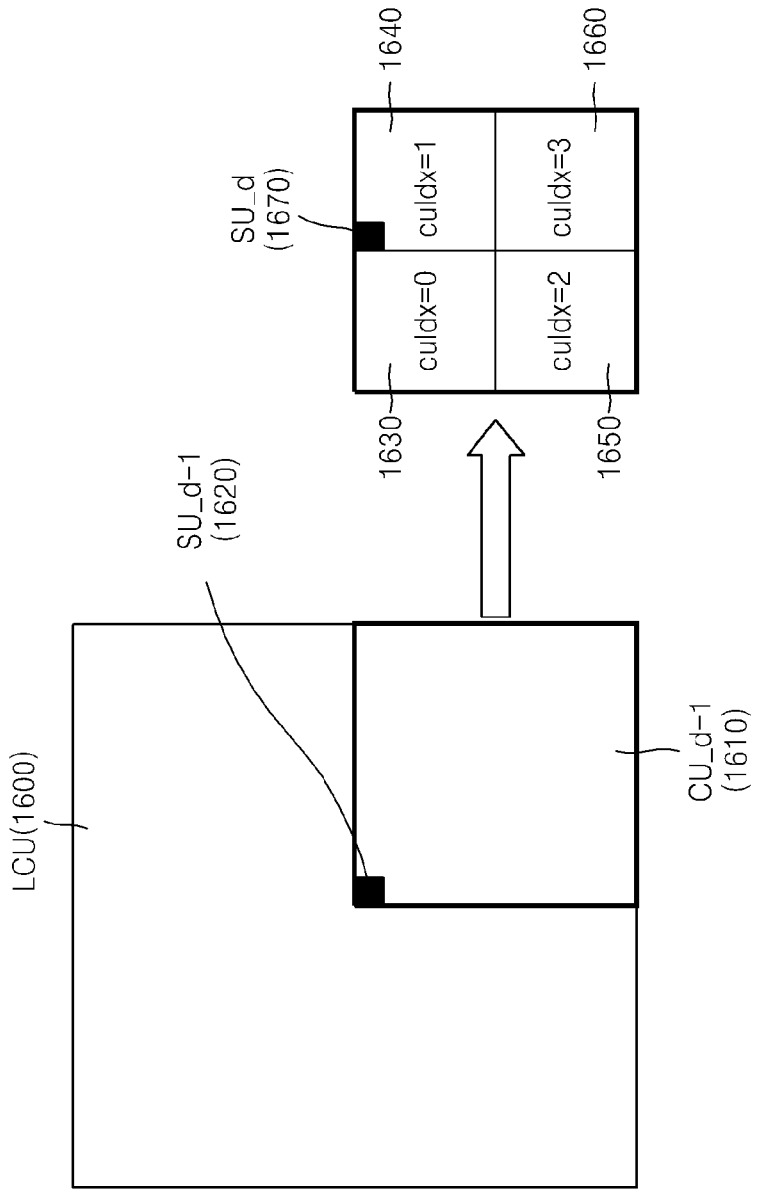
FIG. 19 illustrates indices based on a zigzag scanning order of hierarchical coding units, according to an exemplary embodiment.

FIG. 19 is a diagram illustrating indices based on a zigzag scanning order of hierarchical coded units according to an exemplary embodiment.

The coding unit determiner 1420 of the video encoding apparatus 1400 based on the scanning order of hierarchical data units and the decoder 1530 of the video decoding apparatus 1500 based on the scanning order of hierarchical data units may scan the lower data units included in an upper data unit according to the zigzag scanning order.

A maximum coding unit LCU 1600 includes coding units of a depth d−1 that includes a coding unit CU_d−1 1610. The depth d−1 and a depth d denote an upper depth and a lower depth, respectively, and the coding unit CU_d−1 1610 of the depth d−1 and coding units CU_d 1630, 1640, 1650, and 1660 of the depth d are an upper coding unit and lower coding units, respectively.

The upper coding unit CU_d−1 1610 may include the four coding units CU_d 1630, 1640, 1650, and 1660 as lower coding units. In particular, the four lower coding units CU_d 1630, 1640, 1650, and 1660 may be scanned in the order of the coding unit CU_d 1630 having a coding unit index of 0, the coding unit CU_d 1640 having a coding unit index of 1, the coding unit CU_d 1650 having a coding unit index of 2, and the coding unit CU_d 1660 having a coding unit index of 3, according to indices representing the zigzag scanning order.

The coding unit determiner 1420 and the decoder 1530 may determine a relative location of a minimum unit SU_d located on the left upper end of each of the lower coding units CU_d 1630, 1640, 1650, and 1660 with respect to a maximum coding unit by using the relative location of a minimum unit SU_d−1 1620 located on the left upper end of the upper coding unit CU_d−1 1610 with respect to the maximum coding unit.

For example, a minimum unit index suIdx_d−1 is set for the minimum unit SU_d−1 1620 located on the left upper end of the upper coding unit CU_d−1 1610, according to a zigzag scanning method for a maximum coding unit. In this case, an index suIdx_d of the minimum unit SU_d 1670 located on the left upper end of the lower coding unit CU_d 1640 of the upper coding unit CU_d−1 1610 with respect to a maximum coding unit may be determined from the minimum unit index suIdx_d−1 of the minimum unit SU_d−1 1620 located on the left upper end of the upper coding unit CU_d−1 1610.

For convenience of explanation, a case where the upper coding unit CU_d−1 1610 having a 2N×2N size is split only into coding units CU_d 1630, 1640,1650 and 1660, each having a N×N size, is assumed. An example of a method of determining the index suIdx_d of the minimum unit SU_d 1670 located on the left upper end of the lower coding unit CU_d 1640 follows Equation (4) below:

$$suIdx\_d = suIdx\_d-1 + cuIdx\_d * NumSusInLcu/(4^d) \quad (4)$$

where NumSusInLcu denotes the total number of minimum units SU included in the maximum coding unit LCU 1600. Accordingly, the coding unit determiner 1420 and the decoder 1530 may determine the index suIdx_d of the minimum unit SU_d located on the left upper end of the lower coding unit CU_d, by using the index cuIdx_d of the lower coding unit CU_d and the index suIdx_d−1 of the minimum unit SU_d−1 located on the left upper end of the upper coding unit CU_d−1.

Although Equation (4) presupposes a case where the upper coding unit CU_d−1 having a 2N×2N size is split only into the lower coding units CU_d each having a N×N size and illustrates only indices of coding units with respect to a maximum coding unit based on zigzag scanning as the relative locations of deeper coding units according to depths for convenience of explanation, the coding unit determiner 1420 and the decoder 1530 are not limited thereto.

The coding unit determiner 1420 and the decoder 1530 may determine the relative location of the minimum unit SU_d located on the left upper end of the lower coding unit CU_d with respect to the maximum coding unit LCU, by using the relative location of the lower coding unit CU_d with respect to the maximum coding unit LCU and the relative location of the minimum unit SU_d−1 located on the left upper end of the lower coding unit CU_d−1 with respect to the maximum coding unit LCU.

Figure 20:
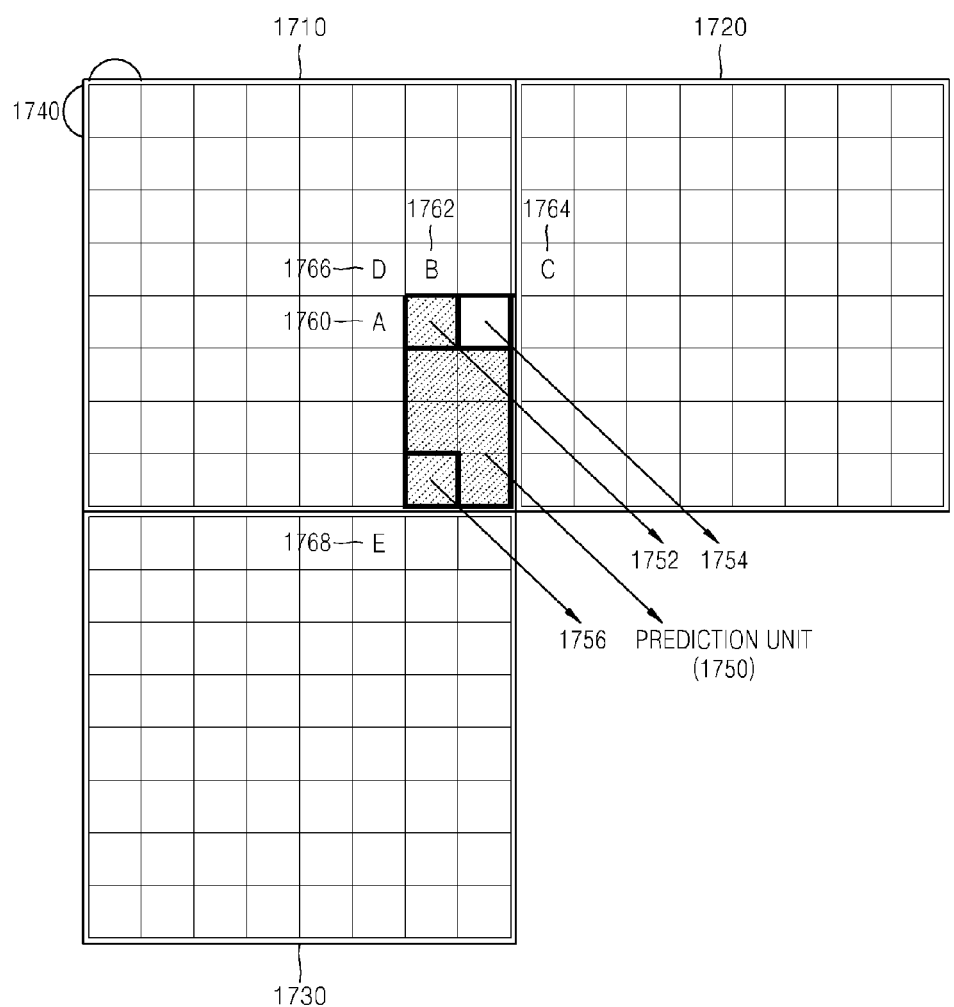
FIG. 20 illustrates relative locations of a maximum coding unit, hierarchical data units, and a minimum unit, according to an exemplary embodiment.

FIG. 20 is a diagram illustrating relative locations of maximum coding units, hierarchical coded units, and minimum units according to an exemplary embodiment.

Maximum coding units 1710, 1720, and 1730 of depth 0 exist, and a size 1740 of each minimum unit corresponds to a size of a coding unit having depth 3. Based on the hierarchical structure of a maximum coding unit, a prediction unit, and a minimum unit, a relative location of the prediction unit with respect to the maximum coding unit follows the zigzag scanning order, and a relative location of the minimum unit with respect to the prediction unit also follows the zigzag scanning order. A relative location of the minimum unit with respect to the maximum coding unit also follows the zigzag scanning order.

Accordingly, relative locations of the minimum units of a current prediction unit 1750 of the current maximum coding unit 1710 with respect to the current maximum coding unit 1710 may be expressed as indices based on the zigzag scanning order in the current maximum coding unit 1710.

The coding unit determiner 1420 and the decoder 1530 may determine the relative locations of minimum units at a predetermined location on the current prediction unit 1750 with respect to a maximum coding unit by using the relative location of a minimum unit 1752 located on the left upper end of the current prediction unit 1750 with respect to the maximum coding unit.

For example, the coding unit determiner 1420 and the decoder 1530 may determine the index of a minimum unit 1754 located on the right upper end on the current prediction unit 1750 with respect to the maximum coding unit and the index of a minimum unit 1756 located on the left lower end of the current prediction unit 1750 with respect to the maximum coding unit, by using the index of the minimum unit 1752 located on the left upper end of the current prediction unit 1750 with respect to the maximum coding unit.

In detail, the coding unit determiner 1420 and the decoder 1530 may determine the index of the minimum unit 1754 located on the right upper end of the current prediction unit 1750 with respect to the maximum coding unit and the index of the minimum unit 1756 located on the left lower end of the current prediction unit 1750 with respect to the maximum coding unit, by using the index of the minimum unit 1752 on the left upper end of the current prediction unit 1750 with respect to the maximum coding unit, the size of a current coding unit, the partition type of the current coding unit, and the index of a current partition type. The partition type of the current coding unit indicates a splitting method and a splitting type of splitting into a current prediction unit in the current coding unit, and the index of the current partition type indicates the index of the current prediction unit with respect to the current coding unit.

According to a hierarchical structure of coding units and data units in video encoding and video decoding according to exemplary embodiments, examples of the partition type of a coding unit, that is, the shape of a prediction unit, may include a symmetrical partition type and an asymmetrical partition type. Examples of the symmetrical partition type of a 2N×2N size coding unit may include a 2N×2N type, a 2N×N type, a N×2N type, and a N×N type. Examples of the asymmetrical partition type may include a 2N×nU type obtained by splitting the height of the 2N×2N size coding unit at a 1:3 ratio, a 2N×nU type obtained by splitting the height of the 2N×2N size coding unit at a 3:1 ratio, a nL×2N type obtained by splitting the width of the 2N×2N size coding unit at a 1:3 ratio, and an nR×2N type obtained by splitting the width of the 2N×2N size coding unit at a 3:1 ratio.

The index of a minimum unit of the current prediction unit may be determined by using the height or width of the current prediction unit and the number of prediction units to serve as variables. However, since the height or width of the current prediction unit and the number of prediction units are changed according to partition types, the coding unit determiner 1420 and the decoder 1530 may set a method of determining the index of a minimum unit of the current prediction unit, according to the partition type of the current prediction unit.

Accordingly, a method of determining an index suIdxAR of the minimum unit 1754 on the right upper end of the current prediction unit 1750 with respect to the maximum coding unit and an index suIdxBL of the minimum unit 1756 on the left lower end of the current prediction unit 1750 with respect to the maximum coding unit by using an index suIdxAL of the minimum unit 1752 on the left upper end of the current prediction unit 1750 with respect to the maximum coding unit may be selectively determined according to whether the partition type of the current prediction unit 1750 is the 2N×2N type, the 2N×N type, the N×2N type, the N×N type, the 2N×nU type, the 2N×nD type, the nL×2N type, or the nR×2N type. A method of determining the index of a minimum unit for each partition type of a prediction unit will be described later with reference to FIG. 22. External minimum units A 1760, B 1762, C 1764, D 1766, and E 1768 adjacent to the minimum units of the current prediction unit 1750 of the current maximum coding unit 1710 are displayed as neighborhood information of the current prediction unit 1750.

For example, left neighborhood information, upper neighborhood information, right upper neighborhood information, left upper neighborhood information, and left lower neighborhood information of the current prediction unit 1750 may indicate the external minimum units A 1760, B 1762, C 1764, D 1766, and E 1768, respectively, located outside the current prediction unit 1750 and on the left side, the upper side, the right upper side, the left upper side, and the left lower side of the minimum unit 1752 on the left upper end of the current prediction unit 1750.

The coding unit determiner 1420 and the decoder 1530 may check a location and usability of a minimum unit that is adjacent to a current prediction unit, and a location of a maximum coding unit. The location of the adjacent minimum unit or the location of the maximum coding unit may be expressed as an index of the minimum unit adjacent to the current prediction unit or an address of an adjacent maximum coding unit that includes the minimum unit adjacent to the current prediction unit.

In a case other than a case (i) where the adjacent maximum coding unit is not included in a current picture, a case (ii) where the adjacent maximum coding unit is not included in a current slice, a case (iii) where an address of the adjacent maximum coding unit is after that of a current maximum coding unit in terms of a scanning order, or a case (iv) where an index of a minimum unit on a left upper side of a deeper coding unit adjacent to the current prediction unit according to a zigzag scanning order is after that of a current minimum unit according to a zigzag scanning order in terms of a scanning order, the data of the adjacent deeper coding unit may be found usable.

To search for neighborhood information of the current prediction unit, an index of a minimum unit located on the left upper end, the right upper end, or the left lower end of the current prediction unit may be considered, and partition type information and information about a current depth are used. If all prediction units are not the same in size, indices of the prediction units for a current coding unit are used.

Figure 21:
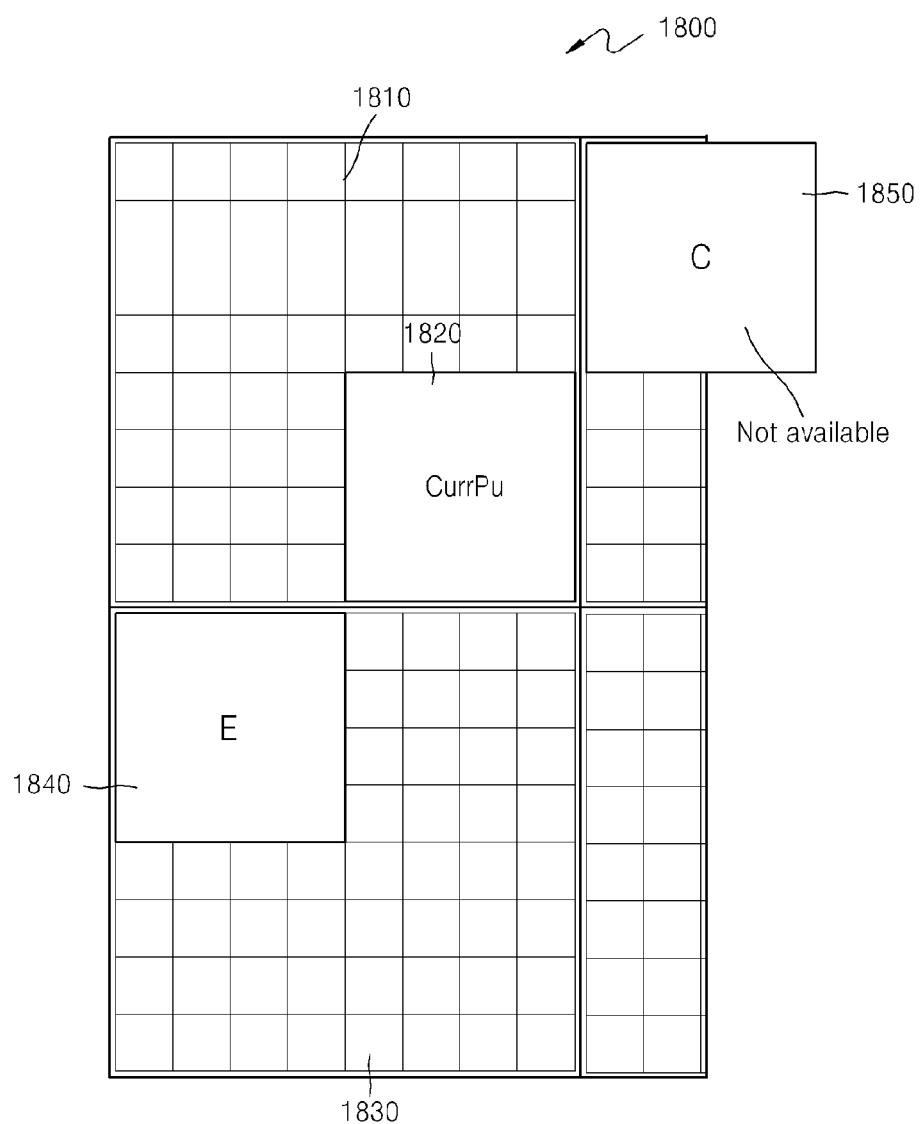
FIG. 21 illustrates adjacent prediction units for arbitrary directive intra prediction according to an exemplary embodiment.

FIG. 21 illustrates adjacent prediction units for arbitrary directive intra prediction according to an exemplary embodiment.

Referring to FIGS. 20 and 21, a method of determining the usability of neighborhood information according to an exemplary embodiment will now be described. A current prediction unit CurrPU 1820 of a coding unit 1810 having a coded depth in a current maximum coding unit 1800 may refer to neighborhood information in order to perform predictive encoding. The coding unit determiner 1420 and the decoder 1530 may search for the index and usability of a prediction unit adjacent to the current prediction unit 1820.

In detail, the coding unit determiner 1420 and the decoder 1530 may determine the location and usability of neighborhood information of the current prediction unit 1820 by using an index suIdx of a minimum unit located on the left upper end of the current prediction unit 1820, an index suIdxAR of a minimum unit located on the right upper end of the current prediction unit 1820, an index suIdxBL of a minimum unit located on the left lower end of the current prediction unit 1820, the partition type of the current prediction unit 1820, the depth of a current coding unit, the index of the current prediction unit 1820 with respect to the current coding unit, and the like.

The neighborhood information of the current prediction unit 1820 may include left neighborhood information A, upper neighborhood information B, right upper neighborhood information C, left upper neighborhood information D, and left lower neighborhood information E of the current prediction unit 1820. The location and usability of each neighborhood information may include the index and usability of a minimum unit adjacent to the current prediction unit 1820 and the address of a maximum coding unit corresponding to the adjacent minimum unit.

In particular, when the coding unit determiner 1420 and the decoder 1530 determine the usability of the right upper neighborhood information C and the left lower neighborhood information E of the current prediction unit 1820 from among the pieces of the neighborhood information, the coding unit determiner 1420 and the decoder 1530 first determine whether the right upper neighborhood information C and the left lower neighborhood information E are accessible data.

The coding unit determiner 1420 and the decoder 1530 may determine the usability of a prediction unit 1850 located on the right upper side of the current prediction unit 1820 from among the right upper neighborhood information C of the current prediction unit 1820.

By using the x coordinate value of the current maximum coding unit, the x coordinate value of the current coding unit, and the width of the current prediction unit 1820 based on its partition type, if the prediction unit 1850 located on the right upper side of the current prediction unit 1820 deviates from a current picture, the prediction unit 1850 is determined as neighborhood information that is not available as reference information. At this time, the x coordinate value of the current coding unit may be determined from the index suIdxAR of the minimum unit on the right upper end of the current prediction unit 1820. The x coordinate value of the current maximum coding unit may be determined from information about the current maximum coding unit based on the index suIdx of the minimum unit on the left upper end of the current prediction unit 1820.

Similarly, the coding unit determiner 1420 and the decoder 1530 may determine the usability of a prediction unit 1840 located on the left upper side of the current prediction unit 1820 from among the left lower neighborhood information E of the current prediction unit 1820. By using the y coordinate value of the current maximum coding unit, the y coordinate value of the current coding unit, and the height of the current prediction unit 1820 based on its partition type, if the prediction unit 1840 located on the left lower side of the current prediction unit 1820 does not deviate from the current picture, the prediction unit 1840 is determined as neighborhood information that is available as reference information.

At this time, the y coordinate value of the current coding unit may be determined from the index suIdxBL of a minimum unit on the right upper end of the current prediction unit 1820. The y coordinate value of the current maximum coding unit may be determined from the information about the current maximum coding unit based on the index suIdx of the minimum unit on the left upper end of the current prediction unit 1820.

However, if the coding unit determiner 1420 and the decoder 1530 ascertains, from information of a minimum unit on the left upper end of the prediction unit 1840 located on the right lower side of the current prediction unit 1820, that a corresponding maximum coding unit 1830 is not yet accessible according to the zigzag scanning order, the coding unit determiner 1420 and the decoder 1530 may determine the prediction unit 1840 located on the right lower side of the current prediction unit 1820 to be neighborhood information that is not available as reference information.

The coding unit determiner 1420 and the decoder 1530 may determine the index and usability of an adjacent minimum unit and search for the index and usability of a corresponding adjacent prediction unit or the address of a corresponding adjacent maximum coding unit from information about the encoding mode of the adjacent minimum unit.

A method in which the coding unit determiner 1420 and the decoder 1530 determine indices of the minimum units of a prediction unit with respect to a maximum coding unit according to the partition types of the prediction unit will now be described with reference to FIGS. 22 through 29. For convenience of explanation, a case where a 2N×2N size of maximum coding unit includes 16 minimum units and a coding unit of a current depth is a maximum coding unit will be illustrated. However, the structure of a maximum coding unit, a coding unit, and a minimum unit is not limited to the above-described case.

Figure 22:
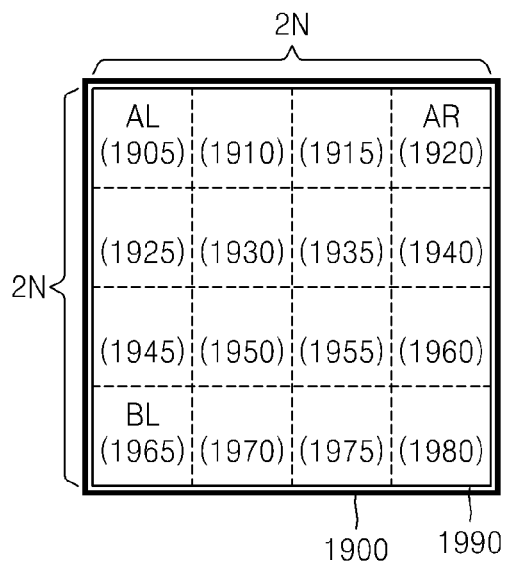
FIG. 22 illustrates locations of minimum units in a 2N×2N sized maximum coding unit and a prediction unit of a partition type 2N×2N, according to an exemplary embodiment.

FIG. 22 illustrates locations of minimum units in a 2N×2N sized maximum coding unit 1900 and in a prediction unit 1990 of a partition type 2N×2N according to an exemplary embodiment.

The 2N×2N-sized maximum coding unit 1900 includes 16 minimum units 1905, 1910, 1915, 1920, 1925, 1930, 1935, 1940, 1945, 1950, 1955, 1960, 1965, 1970, 1975, and 1980.

An index of the minimum unit 1905 on the left upper end of the prediction unit 1990 with respect to the maximum coding unit 1900, the size of a coding unit, the partition type of the prediction unit 1990, and the partition index of the prediction unit 1990 may be used to determine indices of the minimum units 1920 and 1965 on the right upper end and left lower end of the prediction unit 1990, respectively, with respect to the maximum coding unit 1900.

Hereinafter, equations for determining the indices of the minimum units 1905, 1920, and 1965 on the left upper end, right upper end, and left lower end, respectively, of the prediction unit 1990 of the partition type 2N×2N with respect to the maximum coding unit 1900 are illustrated. An absolute index SuIdxUL of the minimum unit 1905 on the left upper end of the maximum coding unit 1900, a size SuSize of each minimum unit, and the number LcuWidthInSus of minimum units arranged in the width direction of the maximum coding unit 1900 may be fixed parameters.

First, a difference between an absolute index of a minimum unit based on a raster scanning order and a relative index of a minimum unit based on a zigzag scanning order according to an exemplary embodiment will be explained. The absolute index of a minimum unit according to an exemplary embodiment denotes an index based on a raster scanning order of the minimum units of a maximum coding unit. The relative index of a minimum unit according to an exemplary embodiment denotes an index based on a zigzag scanning order of the minimum units of the maximum coding unit.

The zigzag scanning order of minimum units according to an exemplary embodiment denotes an order in which four adjacent minimum units are scanned from the left upper end, to the right upper end, to the left lower end, and to the light lower end. Adjacent groups each including 4 minimum units are scanned in a raster scanning order. For example, when 8 minimum units 1905, 1910, 1915, 1920, 1925, 1930, 1935, and 1940 arranged in a raster scanning order are scanned in a zigzag scanning order, they may be scanned in the order of the minimum units 1905, 1910, 1925, 1930, 1915, 1920, 1935, and 1940. Accordingly, when the absolute index and the relative index of the minimum unit 1905 are 0, the absolute index of the minimum unit 1925 may be set to be 4, and the relative index thereof may be set to be 2.

In the below description of FIGS. 22 through 29, a bit operator 'a>>b' denotes a bit shift, and denotes an operation of shifting a bitstring a to the right by b bits. When the bit operator 'a>>b' is described in the decimal system, the bit operator 'a>>b' is the same as an operation of dividing a value a in the decimal system by $2^b$. For example, results of bit operations NumSusInLcu>>1, NumSusInLcu>>2, NumSusInLcu>>3, and NumSusInLcu>>4 using the number NumSusInLcu of minimum units included in a maximum coding unit are 8(=16/2^1), 4(=16/2^2), 2(=16/2^3), and 1(=16/2^4), respectively. The bit operation 'NumSusInLcu>>1' may represent an operation of transforming (increasing or decreasing) a relative index to a minimum unit that goes ahead or behind from a current minimum unit by 8 steps according to a zigzag scanning order. Similarly, the bit operation 'NumSusInLcu>>2' may represent an operation of transforming (increasing or decreasing) a relative index to a minimum unit that goes ahead or behind from the current minimum unit by 4 steps according to the zigzag scanning order, the bit operation 'NumSusInLcu>>3' may represent an operation of transforming (increasing or decreasing) a relative index to a minimum unit that goes ahead or behind from the current minimum unit by 2 steps according to the zigzag scanning order, and the bit operation 'NumSusInLcu>>4' may represent an operation of transforming (increasing or decreasing) a relative index to a minimum unit that goes ahead or behind from the current minimum unit by one step according to the zigzag scanning order.

In the case of the prediction unit 1990 having a partition type of 2N×2N, a relative index suIdxALtemp of the minimum unit 1905 on the left upper end of the prediction unit 1990 with respect to the maximum coding unit 1900 follows the Equation (5):

$$suIdxALtemp = ConvertAbsToRel(SuIdxAL); \quad (5)$$

where an absolute index SuIdxAL represents an index of the minimum unit 1905 on the left upper end of the prediction unit 1990 with respect to the maximum coding unit 1900. A function ConvertAbsToRel( ) converts the absolute index of a maximum coding unit into a relative index.

In the case of the prediction unit 1990 having a partition type of 2N×2N, an index SuIdxAR of the minimum unit 1920 on the right upper end of the prediction unit 1990 with respect to the maximum coding unit 1900 may be determined according to the Equation (6):

$$suIdxARtemp = ConvertAbsToRel(SuIdxUL + CuSize/SuSize - 1); \quad (6)$$

According to the Equation (6), a temporary variable suIdxARtemp represents a relative index of the minimum unit 1920 on the right upper end of the prediction unit 1990 of a partition type 2N×2N.

An index SuIdxBL of the minimum unit 1965 on the left lower end of the prediction unit 1990 with respect to the maximum coding unit 1900 may be determined according to the Equations (7) and (8):

$$suIdxBLtemp = ConvertAbsToRel(SuIdxUL + ((CuSize/SuSize) >> 1 - 1) * LcuWidthInSus); \quad (7)$$

According to the Equation (7), a temporary variable suIdxBLtemp represents a relative index of the minimum unit 1965 of the prediction unit 1990.

$$suIdxBLtemp += NumSusInLcu >> 1; \quad (8)$$

According to the Equations (7) and (8), a temporary variable suIdxBLtemp represents a relative index of the minimum unit 1965 of the prediction unit 1990.

Accordingly, the relative index suIdxBLtemp of the minimum unit 1905 on the left upper end of the current prediction unit 1990, the relative index suIdxARtemp of the minimum unit 1920 on the right upper end thereof, and the relative index suIdxBLtemp of the minimum unit 1965 on the left lower end thereof may be determined using the index SuIdxAL of the minimum unit 1905 on the left upper end of the current prediction unit 1990, a size CuSize of a current coding unit, and the partition type and partition index of the current prediction unit 1990.

Examples of equations for determining the indices of minimum units on the left upper end, right upper end, and left lower end of a prediction unit according to partition types 2N×N, N×2N, N×N, 2N×nU, 2N×nD, nL×2N, and nR×2N of the prediction unit on the basis of the relative indices of the minimum units based on the above-described equations (5), (6), and (7) will now be described in detail with reference to FIGS. 23 through 29.

Figure 23:
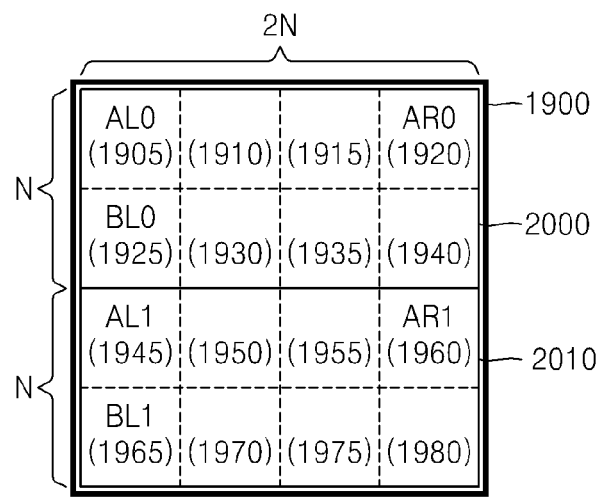
FIG. 23 illustrates locations of minimum units in the 2N×2N sized maximum coding unit and prediction units of a partition type 2N×N according to an exemplary embodiment.

FIG. 23 illustrates locations of minimum units in the 2N×2N sized maximum coding unit 1900 and prediction units 2000 and 2010 each having a partition type 2N×N according to an exemplary embodiment.

In the case of the prediction unit 2000 having a partition type 2N×N and a partition index 0, the Equations (5), (6), and (7) may be used without changes, for indices of a minimum unit AL0 1905 on the left upper end of the prediction unit 2000, a minimum unit AR0 1920 on the right upper end thereof, and a minimum unit BL0 1925 on the left lower end thereof with respect to the maximum coding unit 1900.

$$suIdxALtemp = ConvertAbsToRel(SuIdxAL); \quad (5)$$

$$suIdxARtemp = ConvertAbsToRel(SuIdxUL + CuSize/SuSize - 1); \quad (6)$$

$$suIdxBLtemp = ConvertAbsToRel(SuIdxUL + ((CuSize/SuSize) >> 1 - 1) * LcuWidthInSus); \quad (7)$$

In the case of the prediction unit 2010 having a partition type 2N×N and a partition index 1, Equations (9) and (10) in addition to the Equations (5), (6), (7), and (8) may be set for indices of a minimum unit AL1 1945 on the left upper end of the prediction unit 2010, a minimum unit AR1 1960 on the right upper end thereof, and a minimum unit BL1 1965 on the left lower end thereof.

$$\text{suIdxALtemp}=\text{ConvertAbsToRel}(\text{SuIdxAL}); \qquad (5)$$

$$\text{suIdxALtemp}+=\text{NumSusInLcu}>>1; \qquad (9)$$

$$\text{suIdxARtemp}=\text{ConvertAbsToRel}(\text{SuIdxUL}+\text{CuSize}/\text{SuSize}-1); \qquad (6)$$

$$\text{suIdxARtemp}+=\text{NumSusInLcu}>>1; \qquad (10)$$

$$\text{suIdxBLtemp}=\text{ConvertAbsToRel}(\text{SuIdxUL}+((\text{CuSize}/\text{SuSize})>>1-1)*\text{LcuWidthInSus}); \qquad (7)$$

$$\text{suIdxBLtemp}+=\text{NumSusInLcu}>>1; \qquad (8)$$

According to the Equations (9), (10), and (8), the temporary variables suIdxALtemp, suIdxARtemp, and suIdxBLtemp may represent the relative indices of the minimum unit AL1 1945 on the left upper end of the prediction unit 2010, the minimum unit AR1 1960 on the right upper end thereof, and the minimum unit BL1 1965 on the left lower end thereof, respectively.

Figure 24:
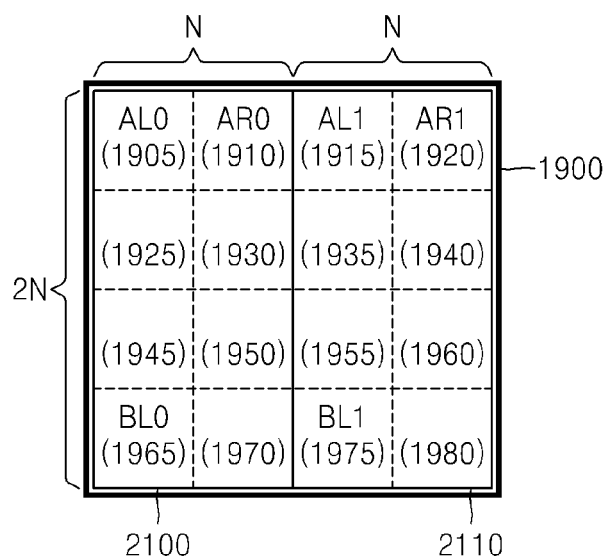
FIG. 24 illustrates locations of minimum units in the 2N×2N sized maximum coding unit and prediction units of a partition type N×2N according to an exemplary embodiment.

FIG. 24 illustrates locations of minimum units in the 2N×2N sized maximum coding unit 1900 and prediction units 2100 and 2110 each having a partition type N×2N according to an exemplary embodiment.

In the case of the prediction unit 2100 having a partition type N×2N and a partition index 0, the Equations (5), (7), and (8) may be used without changes, for indices of a minimum unit AL0 1905 on the left upper end of the prediction unit 2100 and a minimum unit BL0 1965 on the left lower end thereof with respect to the maximum coding unit 1900.

$$\text{suIdxALtemp}=\text{ConvertAbsToRel}(\text{SuIdxAL}); \qquad (5)$$

$$\text{suIdxBLtemp}=\text{ConvertAbsToRel}(\text{SuIdxUL}+((\text{CuSize}/\text{SuSize})>>1-1)*\text{LcuWidthInSus}); \qquad (7)$$

$$\text{suIdxBLtemp}+=\text{NumSusInLcu}>>1; \qquad (8)$$

An Equation (11) may be set based on the Equation (6), for the index of a minimum unit AR0 1910 on the right upper end of the prediction unit 2100 having the partition index 0 with respect to the maximum coding unit 1900:

$$\text{suIdxARtemp}=\text{ConvertAbsToRel}(\text{SuIdxUL}+\text{CuSize}/\text{SuSize}-1); \qquad (6)$$

$$\text{suIdxARtemp}-=\text{NumSusInLcu}>>2; \qquad (11)$$

According to Equations (5), (9), and (11), the temporary variables suIdxALtemp, suIdxBLtemp, and suIdxARtemp may represent the relative indices of the minimum unit AL0 1905 on the left upper end of the prediction unit 2100, the minimum unit BL0 1965 on the left lower end thereof, and the minimum unit AR0 1910 on the right upper end thereof, respectively.

In the case of the prediction unit 2110 having a partition type N×2N and a partition index 1, an Equation (12) may be set based on the Equation (5), for the index of a minimum unit AL1 1915 on the left upper end of the prediction unit 2110:

$$\text{suIdxALtemp}=\text{ConvertAbsToRel}(\text{SuIdxAL}); \qquad (5)$$

$$\text{suIdxALtemp}+=\text{NumSusInLcu}>>2; \qquad (12)$$

An Equation (13) may be set based on the Equation (7), for the index of a minimum unit BL0 1975 on the left lower end of the prediction unit 2110 having the partition type N×2N and the partition index 1 with respect to the maximum coding unit 1900:

$$\text{suIdxBLtemp}=\text{ConvertAbsToRel}(\text{SuIdxUL}+((\text{CuSize}/\text{SuSize})>>1-1)*\text{LcuWidthInSus}); \qquad (7)$$

$$\text{suIdxBLtemp}+=\text{NumSusInLcu}>>2*3; \qquad (13)$$

The Equation (6) may be used without changes, for the index of a minimum unit AR1 1920 on the right upper end of the prediction unit 2110 having the partition type N×2N and the partition index 1 with respect to the maximum coding unit 1900:

$$\text{suIdxARtemp}=\text{ConvertAbsToRel}(\text{SuIdxUL}+\text{CuSize}/\text{SuSize}-1); \qquad (6)$$

According to the Equations (12), (6), and (13), the temporary variables suIdxALtemp, suIdxARtemp, and suIdxBLtemp may represent the relative indices of the minimum unit AL1 1915 on the left upper end of the prediction unit 2110, the minimum unit AR1 1920 on the right upper end thereof, and the minimum unit BL1 1975 on the left lower end thereof, respectively.

Figure 25:
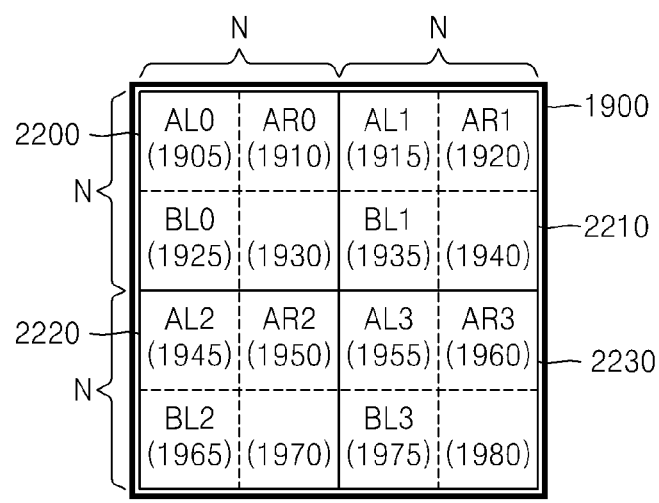
FIG. 25 illustrates locations of minimum units in the 2N×2N sized maximum coding unit and prediction units of a partition type N×N according to an exemplary embodiment.

FIG. 25 illustrates locations of minimum units in the 2N×2N sized maximum coding unit 1900 and prediction units 2200, 2210, 2220, and 2230 each having a partition type N×N according to an exemplary embodiment.

The minimum units on the left upper ends of the prediction units 2200, 2210, 2220, and 2230 each having a partition type N×N in the maximum coding unit 1900 are a minimum unit AL0 1905 having a partition index 0, a minimum unit AL1 1915 having a partition index 1, a minimum unit AL2 1945 having a partition index 2, and a minimum unit AL3 1955 having a partition index 3, respectively. The minimum units on the right upper ends of prediction units 2200, 2210, 2220, and 2230 are a minimum unit AR0 1910 having a partition index 0, a minimum unit AR1 1920 having a partition index 1, a minimum unit AR2 1950 having a partition index 2, and a minimum unit AR3 1960 having a partition index 3, respectively. The minimum units on the left lower ends of prediction units 2200, 2210, 2220, and 2230 are a minimum unit BL0 1925 having a partition index 0, a minimum unit BL1 1935 having a partition index 1, a minimum unit BL2 1965 having a partition index 2, and a minimum unit BL3 1975 having a partition index 3, respectively.

For example, an Equation (14) may be set based on the Equation (6), for the index of the minimum unit AR0 1910 on the right upper end of the prediction unit 2200 having the partition type N×N and the partition index 0 with respect to the maximum coding unit 1900:

$$\text{suIdxARtemp}=\text{ConvertAbsToRel}(\text{SuIdxUL}+\text{CuSize}/\text{SuSize}-1); \qquad (6)$$

$$\text{suIdxARtemp}-=\text{NumSusInLcu}>>2; \qquad (14)$$

For example, an Equation (15) may be set based on the Equation (5), for the index of the minimum unit AL1 1915 on the left upper end of the prediction unit 2210 having the partition type N×N and the partition index 1 with respect to the maximum coding unit 1900:

$$\text{suIdxALtemp}=\text{ConvertAbsToRel}(\text{SuIdxAL}); \qquad (5)$$

$$\text{suIdxALtemp}+=\text{NumSusInLcu}>>2; \qquad (15)$$

For example, equations (7) and (16) may be set according to a partition index CuPartIdx, for the indices of the minimum units BL0 1925, BL1 1935, BL2 1965, and BL3 1975 on the left lower ends of the prediction units 2200, 2210, 2220, and 2230 having the partition type N×N with respect to the maximum coding unit:

$$\text{suIdxBLtemp=ConvertAbsToRel(SuIdxUL+((CuSize/SuSize)}>>1-1)*\text{LcuWidthInSus});\quad(7)$$

$$\text{suIdxBLtemp+=NumSusInLcu}>>2*\text{CuPartIdx};\quad(16)$$

Similar to the Equations (14), (15), and (16), relative indices suIdxALtemp of the minimum units AL0 1905, AL1 1915, AL2 1945, and AL3 1955 on the left upper ends of the prediction units 2200, 2210, 2220, and 2230, relative indices suIdxARtemp of the minimum units AR0 1910, AR1 1920, AR2 1950, and AR3 1960 on the right upper ends thereof, and relative indices suIdxBLtemp on the minimum units BL0 1925, BL1 1935, BL2 1965, and BL3 1975 on the left lower ends thereof may be set as temporary variables.

Figure 26:
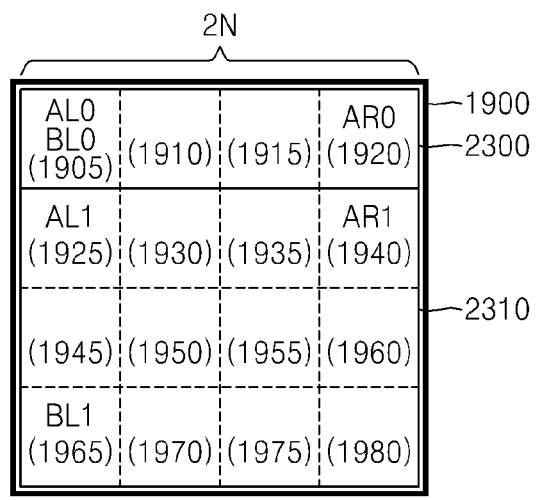
FIG. 26 illustrates locations of minimum units in the 2N×2N sized maximum coding unit and prediction units of a partition type 2N×nU according to an exemplary embodiment.

FIG. 26 illustrates locations of minimum units in the 2N×2N sized maximum coding unit 1900 and prediction units 2300 and 2310 each having a partition type 2N×nU according to an exemplary embodiment.

In the case of the prediction unit 2300 having a partition type 2N×nU and a partition index 0, the Equations (5) and (6) may be used without changes, for indices of a minimum unit AL0 1905 on the left upper end of the prediction unit 2300 and a minimum unit AR0 1920 on the right upper end thereof with respect to the maximum coding unit, respectively.

$$\text{suIdxALtemp=ConvertAbsToRel(SuIdxAL)};\quad(5)$$

$$\text{suIdxARtemp=ConvertAbsToRel(SuIdxUL+CuSize/SuSize-1)};\quad(6)$$

An Equation (17) may be set based on the Equation (7), for the index of the minimum unit BL0 1905 on the left lower end of the prediction unit 2300 having the partition type 2N×nU and the partition index 0 with respect to the maximum coding unit 1900:

$$\text{suIdxBLtemp=ConvertAbsToRel(SuIdxUL+((CuSize/SuSize)}>>1-1)*\text{LcuWidthInSus});\quad(7)$$

$$\text{suIdxBLtemp-=NumSusInLcu}>>3;\quad(17)$$

According to the Equations (5), (6), and (17), the temporary variables suIdxALtemp, suIdxBLtemp, and suIdxARtemp may represent the relative indices of the minimum unit AL0 1905 on the left upper end of the prediction unit 2300, a minimum unit BL0 1905 on the left lower end thereof, and the minimum unit AR0 1920 on the right upper end thereof, respectively.

In the case of the prediction unit 2310 having a partition type 2N×nU and a partition index 1, Equations (18) and (19) may be set based on the Equations (5) and (6), for the indices of a minimum unit AL1 1925 on the left upper end of the prediction unit 2310 and a minimum unit AR1 1940 on the right upper end thereof:

$$\text{suIdxALtemp=ConvertAbsToRel(SuIdxAL)};\quad(5)$$

$$\text{suIdxALtemp+=NumSusInLcu}>>3;\quad(18)$$

$$\text{suIdxARtemp=ConvertAbsToRel(SuIdxUL+CuSize/SuSize-1)};\quad(6)$$

$$\text{suIdxARtemp+=NumSusInLcu}>>3;\quad(19)$$

Equations (7) and (8) below may be used for the index of a minimum unit BL1 1965 on the left lower end of the prediction unit 2310 having the partition type 2N×nU and the partition index 1 with respect to the maximum coding unit:

$$\text{suIdxBLtemp=ConvertAbsToRel(SuIdxUL+((CuSize/SuSize)}>>1-1)*\text{LcuWidthInSus});\quad(7)$$

$$\text{suIdxBLtemp+=NumSusInLcu}>>1;\quad(8)$$

According to the Equations (18), (19), and (8), the temporary variables suIdxALtemp, suIdxARtemp, and suIdxBLtemp may represent the relative indices of the minimum unit AL1 1925 on the left upper end of the prediction unit 2310, the minimum unit AR1 1940 on the right upper end thereof, and the minimum unit BL1 1965 on the left lower end thereof, respectively.

Figure 27:
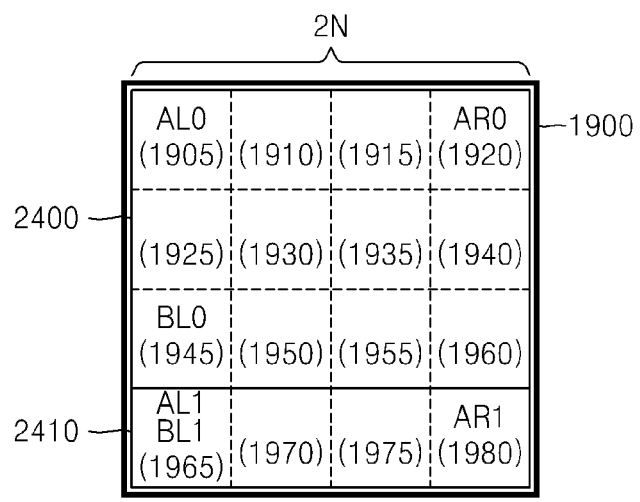
FIG. 27 illustrates locations of minimum units in the 2N×2N sized maximum coding unit and prediction units of a partition type 2N×nD according to an exemplary embodiment.

FIG. 27 illustrates locations of minimum units in the 2N×2N sized maximum coding unit 1900 and prediction units 2400 and 2410 each having a partition type 2N×nD according to an exemplary embodiment.

In the case of the prediction unit 2400 having a partition type 2N×nD and a partition index 0, Equations (5) and (6) may be used for indices of a minimum unit AL0 1905 on the left upper end of the prediction unit 2400 and a minimum unit AR0 1920 on the right upper end thereof with respect to the maximum coding unit, respectively.

$$\text{suIdxALtemp=ConvertAbsToRel(SuIdxAL)};\quad(5)$$

$$\text{suIdxARtemp=ConvertAbsToRel(SuIdxUL+CuSize/SuSize-1)};\quad(6)$$

An Equation (20) may be set based on the Equation (7), for the index of a minimum unit BL0 1945 on the left lower end of the prediction unit 2400 having the partition type 2N×nD and the partition index 0 with respect to the maximum coding unit 1900:

$$\text{suIdxBLtemp=ConvertAbsToRel(SuIdxUL+((CuSize/SuSize)}>>1-1)*\text{LcuWidthInSus});\quad(7)$$

$$\text{suIdxBLtemp+=NumSusInLcu}>>2+\text{NumSusInLcu}>>3;\quad(20)$$

According to the Equations (5), (6), and (20), the temporary variables suIdxALtemp, suIdxBLtemp, and suIdxARtemp may represent the relative indices of the minimum unit AL0 1905 on the left upper end of the prediction unit 2400, the minimum unit BL0 1945 on the left lower end thereof, and the minimum unit AR0 1920 on the right upper end thereof, respectively.

In the case of the prediction unit 2410 having a partition type 2N×nD and a partition index 1, Equations (21) and (22) may be set based on the Equations (5) and (6), for the indices of a minimum unit AL1 1965 on the left upper end of the prediction unit 2410 and a minimum unit AR1 1980 on the right upper end thereof:

$$\text{suIdxALtemp=ConvertAbsToRel(SuIdxAL)};\quad(5)$$

$$\text{suIdxALtemp+=NumSusInLcu}>>1+\text{NumSusInLcu}>>3;\quad(21)$$

$$\text{suIdxARtemp=ConvertAbsToRel(SuIdxUL+CuSize/SuSize-1)};\quad(6)$$

$$\text{suIdxARtemp+=NumSusInLcu}>>1+\text{NumSusInLcu}>>3;\quad(22)$$

Equations (7) and (8) may be used for the index of a minimum unit BL1 1965 on the left lower end of the prediction unit 2410 having the partition type 2N×nD and the partition index 1 with respect to the maximum coding unit 1900:

$$\text{suIdxBLtemp=ConvertAbsToRel(SuIdxUL+((CuSize/SuSize)}>>1-1)*\text{LcuWidthInSus});\quad(7)$$

$$\text{suIdxBLtemp+=NumSusInLcu}>>1;\quad(8)$$

According to the Equations (21), (22), and (6), the temporary variables suIdxALtemp, suIdxARtemp, and suIdxBLtemp may represent the relative indices of the minimum unit AL1 1965 on the left upper end of the prediction unit 2410, the minimum unit AR1 1980 on the right upper end thereof, and the minimum unit BL1 1965 on the left lower end thereof, respectively.

Figures 28, 29:
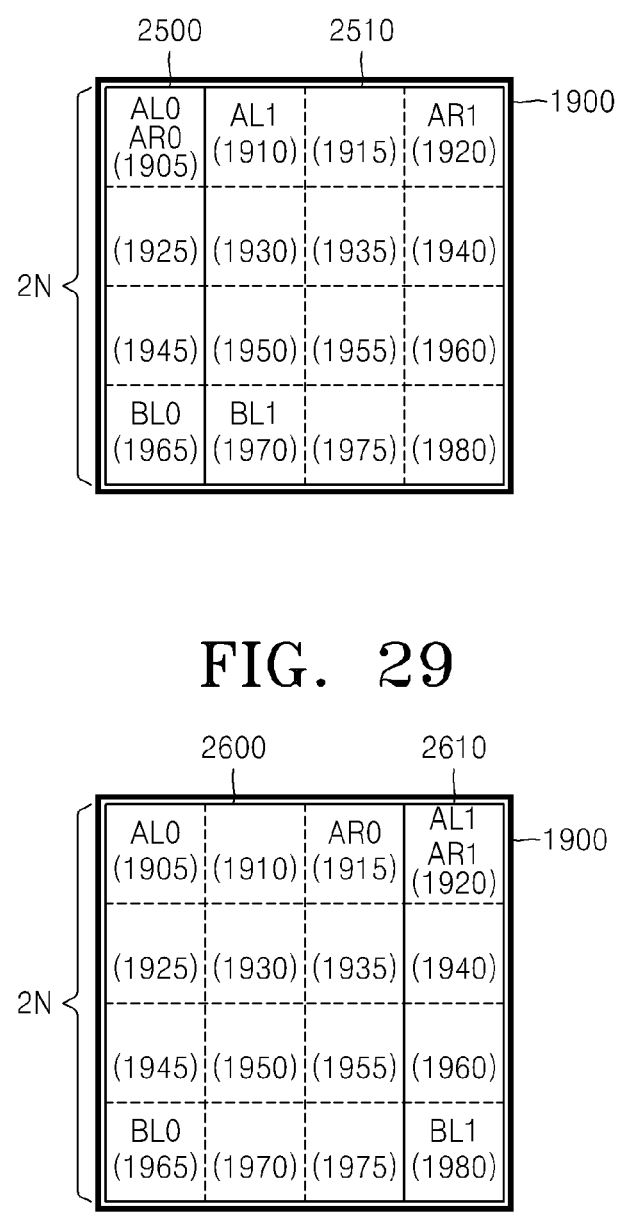

FIG. 28 illustrates locations of minimum units in the 2N×2N sized maximum coding unit 1900 and prediction units 2500 and 2510 each having a partition type nL×2N according to an exemplary embodiment.

In the case of the prediction unit 2500 having a partition type nL×2N and a partition index 0, the Equations (5), (7), and (8) may be used without changes, for indices of a minimum unit AL0 1905 on the left upper end of the prediction unit 2500 and a minimum unit BL0 1965 on the left lower end thereof with respect to the maximum coding unit 1900:

$$suIdxALtemp=ConvertAbsToRel(SuIdxAL); \qquad (5)$$

$$suIdxBLtemp=ConvertAbsToRel(SuIdxUL+((CuSize/SuSize)>>1-1)*LcuWidthInSus); \qquad (7)$$

$$suIdxBLtemp+=NumSusInLcu>>1; \qquad (8)$$

An Equation (23) may be set based on the Equation (6), for the index of the minimum unit AR0 1905 on the right upper end of the prediction unit 2500 having the partition type nL×2N and the partition index 0 with respect to the maximum coding unit:

$$suIdxARtemp=ConvertAbsToRel(SuIdxUL+CuSize/SuSize-1); \qquad (6)$$

$$suIdxARtemp-=NumSusInLcu>>2+NumSusInLcu>>4; \qquad (23)$$

According to the Equations (5), (8), and (23), the temporary variables suIdxALtemp, suIdxBLtemp, and suIdxARtemp may represent the relative indices of the minimum unit AL0 1905 on the left upper end of the prediction unit 2500, the minimum unit BL0 1965 on the left lower end thereof, and the minimum unit AR0 1905 on the right upper end thereof, respectively.

In the case of the prediction unit 2510 having a partition type nL×2N and a partition index 1, Equations (24) and (25) may be set based on the Equations (4) and (7), respectively, for the indices of a minimum unit AL1 1910 on the left upper end of the prediction unit 2510 and a minimum unit BL1 1970 on the left lower end thereof:

$$suIdxALtemp=ConvertAbsToRel(SuIdxAL); \qquad (4)$$

$$suIdxALtemp+=NumSusInLcu>>4; \qquad (24)$$

$$suIdxBLtemp=ConvertAbsToRel(SuIdxUL+((CuSize/SuSize)>>1-1)*LcuWidthInSus); \qquad (7)$$

$$suIdxBLtemp+=NumSusInLcu>>1+NumSusInLcu>>4; \qquad (25)$$

The Equation (6) may be used for the index of the minimum unit AR1 1920 on the right upper end of the prediction unit 2510 having the partition type nL×2N and the partition index 1 with respect to the maximum coding unit 1900:

$$suIdxARtemp=ConvertAbsToRel(SuIdxUL+CuSize/SuSize-1); \qquad (6)$$

According to the Equations (24), (25), and (6), the temporary variables suIdxALtemp, suIdxARtemp, and suIdxBLtemp may represent the relative indices of the minimum unit AL1 1910 on the left upper end of the prediction unit 2510, the minimum unit BL1 1970 on the left lower end thereof, and the minimum unit AR1 1920 on the right upper end thereof, respectively.

FIG. 29 illustrates locations of minimum units in the 2N×2N sized maximum coding unit 1900 and prediction units 2600 and 2610 each having a partition type nR×2N according to an exemplary embodiment.

In the case of the prediction unit 2600 having a partition type nR×2N and a partition index 0, the Equations (5), (7), and (8) may be used without changes, for indices of a minimum unit AL0 1905 on the left upper end of the prediction unit 2600 and a minimum unit BL0 1965 on the left lower end thereof with respect to the maximum coding unit 1900:

$$suIdxBLtemp=ConvertAbsToRel(SuIdxAL); \qquad (5)$$

$$suIdxBLtemp=ConvertAbsToRel(SuIdxUL+((CuSize/SuSize)>>1-1)*LcuWidthInSus); \qquad (7)$$

$$suIdxBLtemp+=NumSusInLcu>>1; \qquad (8)$$

An Equation (26) may be set based on the Equation (6), for the index of a minimum unit AR0 1915 on the right upper end of the prediction unit 2600 having the partition type nR×2N and the partition index 0 with respect to the maximum coding unit:

$$suIdxARtemp=ConvertAbsToRel(SuIdxUL+CuSize/SuSize-1); \qquad (6)$$

$$suIdxARtemp-=NumSusInLcu>>4; \qquad (26)$$

According to the Equations (5), (8), and (26), the temporary variables suIdxALtemp, suIdxBLtemp, and suIdxARtemp may represent the relative indices of the minimum unit AL0 1905 on the left upper end of the prediction unit 2600, the minimum unit BL0 1965 on the left lower end thereof, and the minimum unit AR0 1915 on the right upper end thereof, respectively.

In the case of the prediction unit 2610 having a partition type nR×2N and a partition index 1, Equations (27) and (28) may be set based on the Equations (5) and (7), respectively, for the indices of a minimum unit AU 1920 on the left upper end of the prediction unit 2610 and a minimum unit BL1 1980 on the left lower end thereof:

$$suIdxALtemp=ConvertAbsToRel(SuIdxAL); \qquad (5)$$

$$suIdxALtemp+=NumSusInLcu>>2+NumSusInLcu>>4; \qquad (27)$$

$$suIdxBLtemp=ConvertAbsToRel(SuIdxUL+((CuSize/SuSize)>>1-1)*LcuWidthInSus); \qquad (8)$$

$$suIdxBLtemp+=NumSusInLcu>>1+NumSusInLcu>>2+NumSusInLcu>>4; \qquad (28)$$

The Equation (6) may be used for the index of a minimum unit AR1 1920 on the right upper end of the prediction unit 2610 having the partition type nR×2N and the partition index 1 with respect to the maximum coding unit 1900:

$$suIdxARtemp=ConvertAbsToRel(SuIdxUL+CuSize/SuSize-1); \qquad (6)$$

According to the Equations (27), (28), and (6), the temporary variables suIdxALtemp, suIdxARtemp, and suIdxBLtemp may represent the relative indices of the minimum unit AU 1920 on the left upper end of the prediction unit 2610, the minimum unit BL1 1980 on the left lower end thereof, and the minimum unit AR1 1920 on the right upper end thereof, respectively.

Referring to FIGS. 22 through 29 described above, the relative indices suIdxALtemp, suIdxARtemp, and suIdx- BLtemp of the minimum units on the left upper end, the right upper end, and the left lower end of a current prediction unit may be converted into the absolute indices SuIdxAL, SuIdxAR, and SuIdxBL according to Equations (29) through (31):

$$SuIdxAL = ConvertRelToAbs(suIdxALtemp); \quad (29)$$

$$SuIdxAR = ConvertRelToAbs(suIdxARtemp); \quad (30)$$

$$SuIdxBL = ConvertRelToAbs(suIdxBLtemp); \quad (31)$$

Accordingly, referring to FIGS. 22 through 29, the coding unit determiner 1420 and the decoder 1530 may determine the indices SuIdxAL, SuIdxAR, and SuIdxBL of the minimum units on the left upper end, the right upper end, and the left lower end of a current prediction unit with respect to a maximum coding unit by using the index of the minimum unit on the left upper end of prediction units of current coding unit, the size CuSize of a current coding unit, and the partition type and partition index of the current prediction unit.

Figure 30:
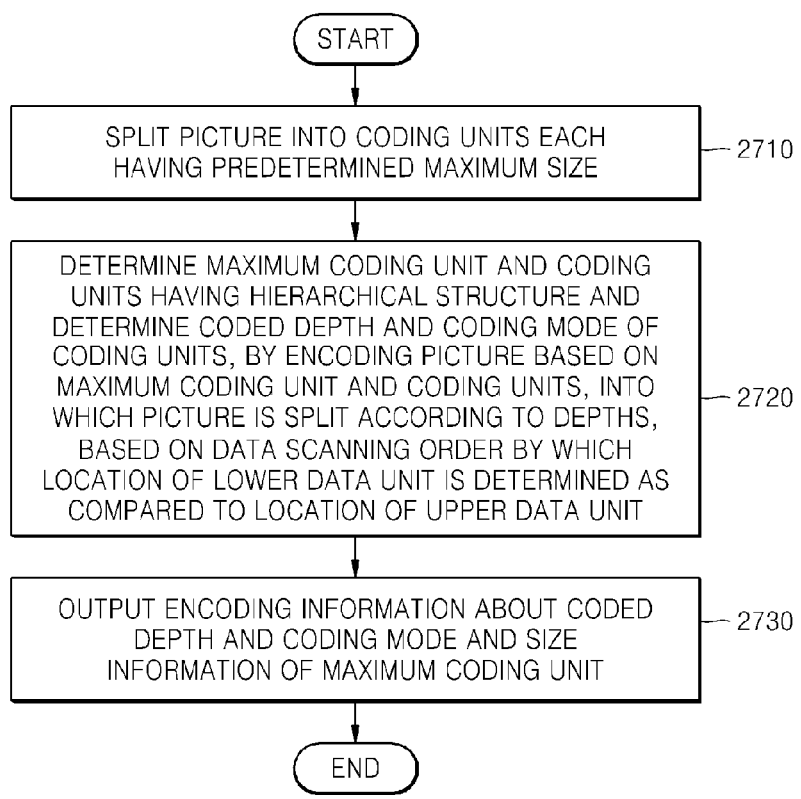
FIG. 30 is a flowchart of a method of encoding a video based on a scanning order of hierarchical data units, according to an exemplary embodiment.

FIG. 30 is a flowchart illustrating an image encoding method based on a scanning order of hierarchical data units, according to an exemplary embodiment.

In operation 2710, a picture is split into coding units each having a predetermined maximum size.

In operation 2720, a maximum coding unit and coding units having a hierarchical structure are determined and a coded depth and a coding mode of the coding units are determined, by encoding the picture based on the maximum coding unit and the coding units, into which the picture is split according to depths. A data scanning order of data units belonging to a hierarchical structure in the coding units having a tree structure may be determined based on the absolute location or relative location of a lower data unit as compared to an upper data unit. For example, the upper data unit may include at least one lower data unit in the order from a maximum coding unit, which is the uppermost data unit, to a minimum coding unit, which is the lowermost data unit, through a deeper coding unit, a coding unit, a prediction unit, and a partition.

In other words, encoding based on the data scanning order depending on the absolute locations and relative locations of coding units of at least one depth having a hierarchical structure may be performed on each maximum coding unit in units of regions into which the maximum coding unit is hierarchically split as the depth deepens. Consequently, a coding mode for a coding unit of a coded depth including information about at least one coded depth in which a result of the coding on each region is to be output may be determined.

In operation 2730, encoding information about a coded depth and a coding mode and size information of the maximum coding unit are output for each maximum coding unit. Coded video data may also be output.

FIG. 31 is a flowchart of a video decoding method based on a scanning order of hierarchical data units, according to an exemplary embodiment.

In operation 2810, a bitstream for an encoded video is received and parsed.

In operation 2820, encoding information about a coded depth and a coding mode of coding units and size information of a maximum coding unit are extracted from a bitstream. Coded video data may also be extracted.

In operation 2830, a hierarchical structure of the maximum coding unit and the coding units is determined and a picture is restored based on the coding units, by using the encoding information about the coded depth and the coding mode and the size information of the maximum coding unit. Pieces of image data may be read and decoded in a data scanning order determined due to the absolute location or relative location of a lower data unit determined as compared to the location of an upper data unit from among data units determined by coding units having a tree structure.

In other words, video data obtained by encoding each coding unit of at least one coded depth of the maximum coding unit is decoded based on the encoding information about a coded depth and a coding mode for each maximum coding unit. The coded video data is read based on the data scanning order depending on the absolute locations and relative locations of the coding units of at least one depth having a hierarchical structure, and current video data may be decoded by referring to neighborhood information read and decoded in a scanning order.

In the video encoding method based on the scanning order of hierarchical data units according to the exemplary embodiment of FIG. 23 and the video decoding method based on the scanning order of hierarchical data units according to the exemplary embodiment of FIG. 24, the absolute location of a coding unit and the relative location of the coding unit with respect to a maximum coding unit may be transformed into each other and analyzed in the zigzag scanning order of the data units having the hierarchical structure.

In the relationship between an upper coding unit and a lower coding unit in the maximum coding unit, the absolute location or relative location of the lower coding unit may be determined using the absolute location or relative location of the upper coding unit. In contrast, the pixel position or index of a corresponding deeper coding unit or a corresponding prediction unit may be determined based on the absolute location of a minimum unit or the index of the minimum unit with respect to the maximum coding unit.

Based on the relative location of a minimum unit located on the left upper end of an upper data unit, the relative location of a minimum unit at a location different from the left upper end of the upper data unit may be determined.

The usability of neighborhood information may be determined from the location of a current maximum coding unit, the index of a minimum unit of a current prediction unit, and the partition type of the current prediction unit. For example, it is determined whether neighborhood information of a current prediction unit exists in a current picture or can be referred to by being accessed in a zigzag scanning order, and the usability of the neighborhood information may be determined, by using the x and y coordinate values of a current maximum coding unit determined from the location of the current maximum coding unit, the x coordinate value of a current coding unit determined from the index of a minimum unit on the right upper end of the current maximum coding unit, and the y coordinate value of the current coding unit determined from the index of a minimum unit on the left lower end of the current maximum coding unit.

Accordingly, a video encoding method based on the scanning order of hierarchical data units according to an exemplary embodiment and a video decoding method based on the scanning order of hierarchical data units according to an exemplary embodiment are capable of accurately and quickly analyzing the positions of various types of data units when using data units relatively larger than existing macroblocks and the various types of data units, by mutually transforming the relative locations and absolute locations of the data units based on the scanning order of the hierarchical data units, thereby efficiently encoding or decoding a video.

Furthermore, one or more exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Moreover, one or more units of the above-described apparatuses can include a processor or microprocessor executing a computer program stored in a computer-readable medium.

While exemplary embodiments have been particularly shown and described, it will be understood by those of ordinary skill in the art that various changes in form and details may be made therein without departing from the spirit and scope of the present inventive concept as defined by the appended claims. The exemplary embodiments should be considered in descriptive sense only and not for purposes of limitation. Therefore, the scope of the present inventive concept is defined not by the detailed description of exemplary embodiments, but by the appended claims, and all differences within the scope will be construed as being included in the present inventive concept.

What is claimed is:

1. A video decoding method based on a scanning order of hierarchical data units, the video decoding method comprising:

receiving and parsing a bitstream of an encoded video;

extracting, from the bitstream, information about a size of a maximum coding unit for decoding a picture of the encoded video, and encoding information about a coded depth and an encoding mode for coding units in the maximum coding unit, wherein the size of the maximum coding unit is a maximum size of the coding units which are data units for decoding the picture;

determining the maximum coding unit, which is one of maximum coding units spatially split from the picture by using the extracted information about the size of the maximum coding unit, and determining a hierarchical structure of the coding units into which the maximum coding unit is divided according to depths, determining prediction units of the coding units by using partition types among the extracted encoding information and determining transformation units of the coding units by using transformation split information among the extracted encoding information; and decoding the coding units in the maximum coding unit by performing inverse transformation on the transformation units and performing prediction on the prediction units by using the extracted encoding information about the coded depth and the encoded mode, wherein a data scanning index of the coding units according to a zigzag scanning order in the maximum coding unit is determined based on absolute locations of the coding units in an entire picture, wherein the coded depth indicates a depth where a coding unit is encoded, wherein the absolute locations comprise a location of coding units with respect to the entire picture and, wherein the prediction units and the transformation units are separately determined in each of the coding units.

2. The video decoding method of claim 1, wherein, based on the hierarchical structure of the coding units:

the lower data unit of the maximum coding unit comprises at least one of deeper coding units according to the depths, a coding unit of the coded depth, a prediction unit for prediction-decoding the coding unit, a transformation unit for inversely transforming the coding unit, and a minimum unit; and among an upper data unit and at least one lower data unit in the hierarchical structure of the coding units, the upper data unit comprises the at least one lower data unit in an order of the maximum coding unit, the deeper coding units according to the depths, the coding unit of the coded depth, the prediction unit, and the minimum unit.

3. The video decoding method of claim 2, wherein the decoding comprises determining a relative location of the lower coding unit with respect to the maximum coding unit or an absolute location of the lower coding unit in the picture by using a relative location of the upper coding unit with respect to the maximum coding unit or an absolute location of the upper coding unit in the picture, wherein the relative location comprises a location of a coding unit with respect to a maximum coding unit.

4. The video decoding method of claim 3, wherein an index of a top-left minimum unit in a predetermined lower coding unit included in the upper coding unit with respect to the maximum coding unit is determined by using an index of a top-left minimum unit in the upper coding unit with respect to the maximum coding unit.

5. The video decoding method of claim 2, wherein, in a relationship between the upper coding unit and lower coding units of the deeper coding units according to the depths included in the maximum coding unit, a relative location of a predetermined lower coding unit with respect to the upper coding unit is expressed as an index of the predetermined lower coding unit based on the zigzag scanning order of the lower coding units included in the upper coding unit.

6. The video decoding method of claim 2, wherein the decoding comprises determining relative locations of minimum units included in a current prediction unit with respect to the maximum coding unit by using a relative location of a predetermined minimum unit included in the current prediction unit with respect to the maximum coding unit.

7. The video decoding method of claim 6, wherein the determining the relative locations of the minimum units with respect to the maximum coding unit comprises determining an index of a minimum unit located on a right upper end of the current prediction unit with respect to the maximum coding unit or an index of a minimum unit located on a left lower end of the current prediction unit with respect to the maximum coding unit, by using an index of a minimum unit located on a left upper end of the current prediction unit with respect to the maximum coding unit.

8. The video decoding method of claim 7, wherein in the determining the relative locations of the minimum units with respect to the maximum coding unit, methods of determining indices of the minimum units with respect to the maximum coding unit are distinguished from one another according to partition types and partition indices of coding units that include prediction units.

9. The video decoding method of claim 8, wherein the partition type is a symmetrical partition type for halving a height or a width of a coding unit or an asymmetrical partition type for asymmetrically splitting the height or the width of the coding unit.

10. The video decoding method of claim 8, wherein the determining the index of the minimum unit located on the right upper end of the current prediction unit or the index of the minimum unit located on the left lower end of the current prediction unit comprises using the index of the minimum unit located on the left upper end of the current prediction unit with respect to the maximum coding unit and a size, a partition type, and a partition index of a coding unit that includes the current prediction unit.

11. The video decoding method of claim 2, wherein the decoding comprises determining an index of an adjacent minimum unit of a current prediction unit with respect to a corresponding maximum coding unit and usability indicating whether the adjacent minimum unit is usable as reference information for arbitrary directive intra prediction, by using indices of minimum units included in the current prediction unit which are based on the zigzag scanning order, in order to determine the reference information.

12. The video decoding method of claim 11, wherein the determining the usability comprises determining whether a prediction unit including the adjacent minimum unit deviates from the picture, by using a size of the prediction unit based on an absolute location of the maximum coding unit, an absolute location of a current coding unit, and a partition type and a relative location of the current prediction unit.

13. The video decoding method of claim 2, wherein encoding information comprising at least one of information about a current coding unit comprising the minimum unit and information about a prediction mode of the prediction units is set for the minimum unit.

14. The video decoding method of claim 2, wherein the decoding comprises analyzing the hierarchical structure of the coding units by independently determining the maximum coding unit and the coding units according to each coded depth by using the encoding information about the coded depth and the encoding mode.

15. The video decoding method of claim 2, wherein:
the deeper coding units according to the depths are regions into which the maximum coding unit is split by a number of splitting times corresponding to each depth; and
the coding unit of the coded depth, among the deeper coding units according to the depths, is a region into which the maximum coding unit is split according to the coded depth, and encoded image data extractable from the bitstream is data encoded based on the coding unit of the coded depth.

16. A non-transitory computer-readable recording medium having recorded thereon a program for executing the video decoding method of claim 1.

17. A video encoding method based on a scanning order of hierarchical data units, the video encoding method comprising:
splitting a picture into maximum coding units which have a maximum size of a coding unit which is a data unit in which the picture is encoded;
determining coding units having a hierarchical structure into which a maximum coding unit is split according to depths and determining prediction units for performing prediction on the coding units and transformation units for performing transformation on the coding units;
determining a coded depth and an encoding mode of the coding units, wherein the encoding mode includes partition types of the prediction units and transformation split information of the transformation units; and
outputting encoding information about the coded depth and the encoding mode and size information of the maximum coding unit,
wherein a data scanning index of the coding units according to a zigzag scanning order in the maximum coding unit is determined based on absolute positions of the coding units in an entire picture,
wherein the coded depth indicates a depth where a coding unit is encoded;
wherein the absolute locations comprise locations of coding units with respect to the entire picture, and
wherein the prediction units and the transformation units are separately determined in each of the coding units.

18. The video encoding method of claim 17, wherein, based on the hierarchical structure of the coding units, the lower data unit of the maximum coding unit comprises at least one of deeper coding units according to the depths, a coding unit of the coded depth, a prediction unit for prediction-encoding the coding unit, a minimum unit, and a transformation unit for transforming the coding unit.

19. The video encoding method of claim 17, wherein the determining comprises determining a relative location of the lower coding unit with respect to the maximum coding unit or an absolute location of the lower coding unit in the picture by using a relative location of the upper coding unit with respect to the maximum coding unit or an absolute location of the upper coding unit in the picture,
wherein the relative location comprises a location of a coding unit with respect to a maximum coding unit.

20. The video encoding method of claim 19, wherein the determining the relative location or the absolute location comprises determining an index of a top-left minimum unit in a predetermined lower coding unit included in the upper coding unit with respect to the maximum coding unit, by using an index of a top-left minimum unit in the upper coding unit with respect to the maximum coding unit.

21. The video encoding method of claim 17, wherein, in a relationship between the upper coding unit and lower coding units of deeper coding units according to the depths included in the maximum coding unit, a relative location of a predetermined lower coding unit with respect to the upper coding unit is expressed as an index of the predetermined lower coding unit based on the zigzag scanning order of the lower coding units included in the upper coding unit.

22. The video encoding method of claim 17, wherein the determining comprises determining relative locations of minimum units included in a current prediction unit with respect to the maximum coding unit by using a relative location of a predetermined minimum unit included in the current prediction unit with respect to the maximum coding unit.

23. The video encoding method of claim 22, wherein the determining the relative locations of the minimum units with respect to the maximum coding unit comprises determining an index of a minimum unit located on a right upper end of the current prediction unit with respect to the maximum coding unit or an index of a minimum unit located on a left lower end of the current prediction unit with respect to the maximum coding unit, by using an index of a minimum unit located on a left upper end of the current prediction unit with respect to the maximum coding unit.

24. The video encoding method of claim 23, wherein in the determining the relative locations of the minimum units with respect to the maximum coding unit, methods of determining indices of the minimum units with respect to the maximum coding unit are distinguished from one another according to partition types and partition indices of coding units that include prediction units.

25. The video encoding method of claim 24, wherein the partition type is a symmetrical partition type for halving a height or a width of a coding unit or an asymmetrical partition type for asymmetrically splitting the height or the width of the coding unit.

26. The video encoding method of claim 24, wherein the determining the index of the minimum unit located on the right upper end of the current prediction unit or the index of the minimum unit located on the left lower end of the current prediction unit comprises using the index of the minimum unit located on the left upper end of the current prediction unit with respect to the maximum coding unit and a size, a partition type, and a partition index of a coding unit that includes the current prediction unit.

27. The video encoding method of claim 16, wherein the determining comprises determining an index of an adjacent minimum unit of a current prediction unit with respect to a corresponding maximum coding unit and usability indicating whether the adjacent minimum unit is usable as reference information for arbitrary directive intra prediction, by using indices of minimum units included in the current prediction unit which are based on the zigzag scanning order, in order to determine the reference information.

28. The video encoding method of claim 27, wherein the determining the usability comprises determining whether a prediction unit including the adjacent minimum unit deviates from the picture, by using a size of the prediction unit based on an absolute location of the maximum coding unit, an absolute location of a current coding unit, and a partition type and a relative location of the current prediction unit, wherein the relative location comprises a location of a coding unit with respect to a maximum coding unit.

29. The video encoding method of claim 17, wherein the outputting comprises outputting encoding information comprising at least one of information about a current coding unit comprising a current minimum unit, and information about a prediction mode of the prediction units.

30. The video encoding method of claim 18, wherein:
the deeper coding units according to the depths are regions into which the maximum coding unit is split by a number of splitting times corresponding to each depth;
the coding unit of the coded depth, among the deeper coding units according to the depths, is a region into which the maximum coding unit is split according to the coded depth; and
image data of the picture is encoded based on the coding unit of the coded depth.

31. The video encoding method of claim 30, wherein the determining comprises independently determining a coded depth for the maximum coding unit and the coding units, and determining the hierarchical structure of the coding units by splitting a deeper coding unit into coding units corresponding to a lower depth independently from another deeper coding unit, based on the coded depth.

32. A non-transitory computer-readable recording medium having recorded thereon a program for executing the video encoding method of claim 17.

33. A video decoding apparatus based on a scanning order of hierarchical data units, the apparatus comprising:
a receiver which receives and parses a bitstream for an encoded video;
an extractor which extracts, from the bitstream, information about a size of a maximum coding unit for decoding a picture of the encoded video, and encoding information about a coded depth and an encoding mode for coding units in the maximum coding unit, wherein the size of the maximum coding unit is a maximum size of the coding units which are data units for decoding the picture; and
a decoder which determines the maximum coding unit, which is one of maximum coding units spatially split from the picture by using the extracted information about the size of the maximum coding unit, determines a hierarchical structure of the coding units into which the maximum coding unit is divided according to depths, determines prediction units of the coding units by using partition types among the extracted encoding information, determines transformation units of the coding units by using transformation split information among the extracted encoding information, and decodes the coding units in the maximum coding unit by performing inverse transformation on the transformation units and performing prediction on the prediction units by using the extracted encoding information about the coded depth and the encoded mode, wherein a data scanning order of an upper data unit and a lower data unit included in the hierarchical structure of the coding units is determined based on an absolute location or a relative location of the lower data unit in comparison to a location of the upper data unit, wherein a data scanning index of the coding units according to a zigzag scanning order in the maximum coding unit is determined based on absolute locations of the coding units in an entire picture, wherein the coded depth indicates a depth where a coding unit is encoded, and wherein the absolute location comprises a location of a coding unit with respect to an entire picture, and wherein the prediction units and the transformation units are separately determined in each of the coding units.

34. A video encoding apparatus based on a scanning order of hierarchical data units, the apparatus comprising:
a maximum coding unit splitter which splits a picture into maximum coding units which have a maximum size of a coding unit which is a data unit in which the picture is encoded;
a coding unit determiner which determines coding units having a hierarchical structure into which a maximum coding unit is split according to depths, determines prediction units for performing prediction on the coding units and transformation units for performing transformation on the coding units, and determines a coded depth and an encoding mode of the coding units, wherein the encoding mode includes partition types of the prediction units and transformation split information of the transformation units; and
an information output unit which outputs encoding information about the coded depth and the encoding mode and size information of the maximum coding unit, wherein a data scanning index of the coding units according to a zigzag scanning order in the maximum coding unit is determined based on absolute positions of the coding units in an entire picture, wherein the coded depth indicates a depth where a coding unit is encoded wherein the absolute locations comprise locations of coding units with respect to the entire picture, and wherein the prediction units and the transformation units are separately determined in the each of the coding units.

* * * * *